US011933670B2

(12) United States Patent
Bahr et al.

(10) Patent No.: US 11,933,670 B2
(45) Date of Patent: Mar. 19, 2024

(54) METHODS AND APPARATUS TO DETECT INFRARED WAVELENGTHS USING A MECHANICAL RESONATOR WITH AN INTEGRATED PLASMONIC INFRARED ABSORBER

(71) Applicant: Texas Instruments Incorporated, Dallas, TX (US)

(72) Inventors: Bichoy Bahr, Allen, TX (US); Jeronimo Segovia Fernandez, San Jose, CA (US); Hassan Omar Ali, Murphy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 217 days.

(21) Appl. No.: 17/463,013

(22) Filed: Aug. 31, 2021

(65) Prior Publication Data

US 2023/0061753 A1     Mar. 2, 2023

(51) Int. Cl.
*G01J 1/46* (2006.01)
*G01J 1/04* (2006.01)
*G02B 5/20* (2006.01)

(52) U.S. Cl.
CPC .............. *G01J 1/46* (2013.01); *G01J 1/0403* (2013.01); *G01J 1/0488* (2013.01); *G02B 5/208* (2013.01)

(58) Field of Classification Search
None
See application file for complete search history.

(56) References Cited

U.S. PATENT DOCUMENTS

| | | | |
|---|---|---|---|
| 3,958,122 A * | 5/1976 | Jowett | G01N 21/3504 250/344 |
| 9,232,289 B2 | 1/2016 | Bahr et al. | |
| 9,712,136 B2 | 7/2017 | Rinaldi et al. | |
| 10,084,426 B2 | 9/2018 | Bahr et al. | |
| 2007/0108383 A1 * | 5/2007 | Combes | G01K 5/56 374/E5.036 |
| 2012/0286161 A1 * | 11/2012 | Raieszadeh | G01J 5/06 250/338.3 |
| 2013/0112876 A1 * | 5/2013 | Nam | G01J 5/046 250/338.1 |
| 2014/0246749 A1 * | 9/2014 | Nam | G01J 5/12 257/467 |
| 2015/0035110 A1 * | 2/2015 | Pisano | G01J 5/34 438/54 |
| 2016/0099701 A1 * | 4/2016 | Rinaldi | H03H 9/13 422/90 |
| 2019/0006136 A1 * | 1/2019 | Rinaldi | H01H 37/10 |
| 2019/0049309 A1 * | 2/2019 | Tin | G01J 5/10 |

(Continued)

OTHER PUBLICATIONS

Bhar et al., "Vertical Acoustic Confinement for High-Q Fully-Differential CMOS-RBTS," 2006, 4 pages.

(Continued)

*Primary Examiner* — Marcus H Taningco
(74) *Attorney, Agent, or Firm* — John R. Pessetto; Frank D. Cimino

(57) ABSTRACT

An example apparatus includes: a semiconductor substrate; a mechanical resonator supported by the substrate, the mechanical resonator including an array of capacitors; and a plasmonic infrared (IR) absorber including an array of metal structures. The mechanical resonator is between the substrate and the IR absorber.

21 Claims, 14 Drawing Sheets

(56) References Cited

U.S. PATENT DOCUMENTS

| | | | |
|---|---|---|---|
| 2019/0360924 A1* | 11/2019 | Macrelli | H10N 10/80 |
| 2020/0116694 A1* | 4/2020 | Rinaldi | G01N 27/125 |
| 2021/0099237 A1 | 4/2021 | Bahr et al. | |
| 2021/0302308 A1* | 9/2021 | Segovia Fernandez | G01N 21/554 |
| 2021/0376179 A1* | 12/2021 | Bartolome | H01L 27/14658 |
| 2021/0389183 A1* | 12/2021 | Guo | G01J 3/513 |

OTHER PUBLICATIONS

Bhar et al., "Optimization of Unreleased CMOS-MEMS RBTs," 2016 IEEE International Frequency Control Symposium (IFCS), 2016, pp. 1-4, 4 pages.

Bhar et al., "Theory and Design of Phononic Crystals for Unreleased CMOS-MEMS Resonant Body Transistors," Journal of Microelectromechanical Systems, vol. 24, No. 5, Oct. 2015, 14 pages.

Qian et al., "Narrowband MEMS Resonant Infrared Detectors based on Ultrathin Perfect Plasmonic Absorbers," 2016 IEEE Sensors, 2016, pp. 625-627, 3 pages.

Hui et al., "Plasmonic piezoelectric nanomechanical resonator for spectrally selective infrared sensing," Apr. 15, 2016, 9 pages.

\* cited by examiner

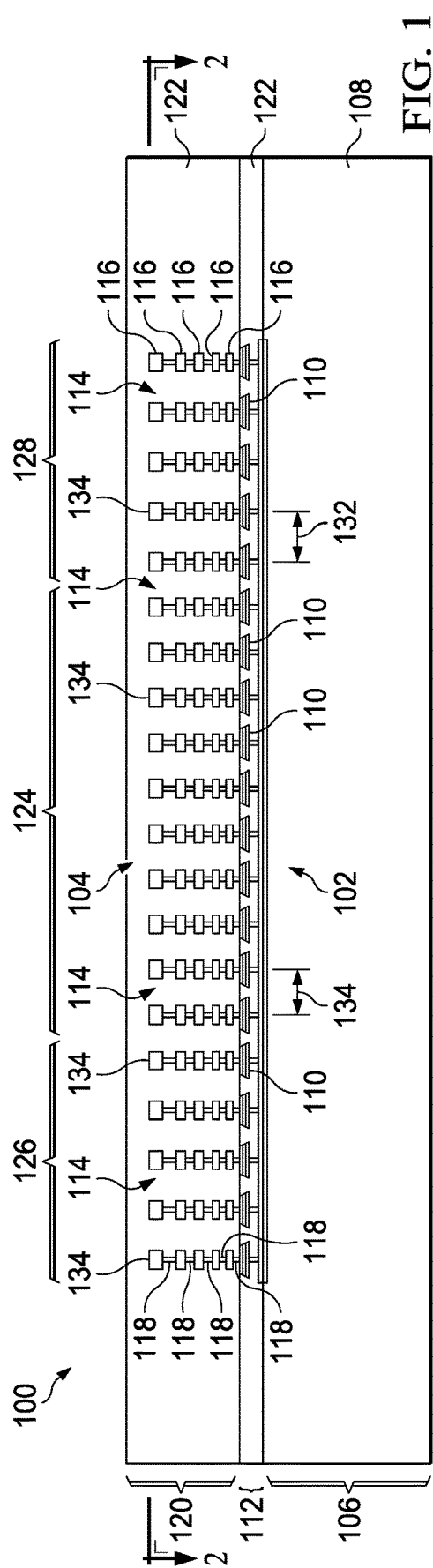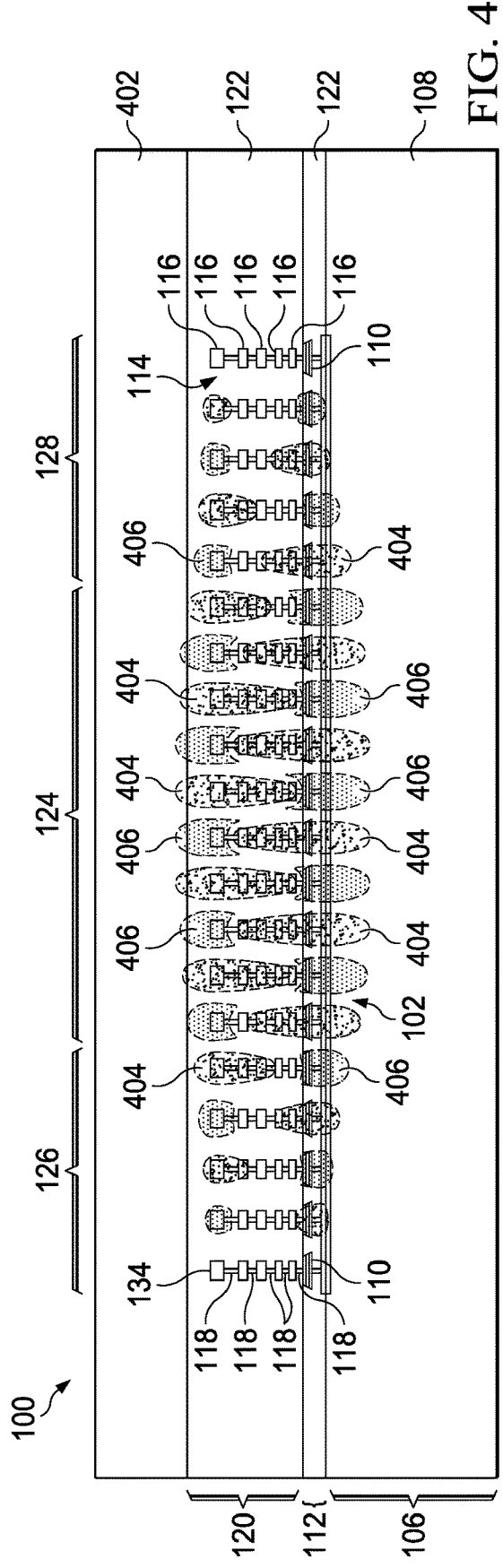

METHODS AND APPARATUS TO DETECT INFRARED WAVELENGTHS USING A MECHANICAL RESONATOR WITH AN INTEGRATED PLASMONIC INFRARED ABSORBER

TECHNICAL FIELD

This description relates generally to infrared detectors, and more particularly to methods and apparatus to detect infrared wavelengths using a mechanical resonator with an integrated plasmonic infrared absorber.

BACKGROUND

Narrow band infrared (IR) detectors are employed in many different application. One application for IR detectors is in the detection and analysis of gases. IR detectors are able to detect and/or analyze gases because different gases absorb and reflect different wavelengths of IR radiation. As a result, when IR radiation is beamed towards a volume of gas(es), an IR detector can detect which wavelength(s) of the IR radiation are reflected and which wavelength(s) are absorbed by the gas(es). Based on the wavelengths detected, it is possible to determine the particular gas(es) included in the volume.

SUMMARY

For methods and apparatus to detect infrared wavelengths using a mechanical resonator with an integrated plasmonic infrared absorber, an example apparatus includes a semiconductor substrate; a mechanical resonator supported by the substrate, the mechanical resonator including an array of capacitors; and a plasmonic infrared (IR) absorber including an array of metal structures. The mechanical resonator is between the substrate and the IR absorber.

BRIEF DESCRIPTION OF THE DRAWINGS

FIG. 1 is a cross-sectional view of an example IR sensor structure constructed in accordance with teachings disclosed herein.

FIG. 4 illustrates an example stress profile across the example IR sensor structure of FIG. 1.

DETAILED DESCRIPTION

Figure 2:
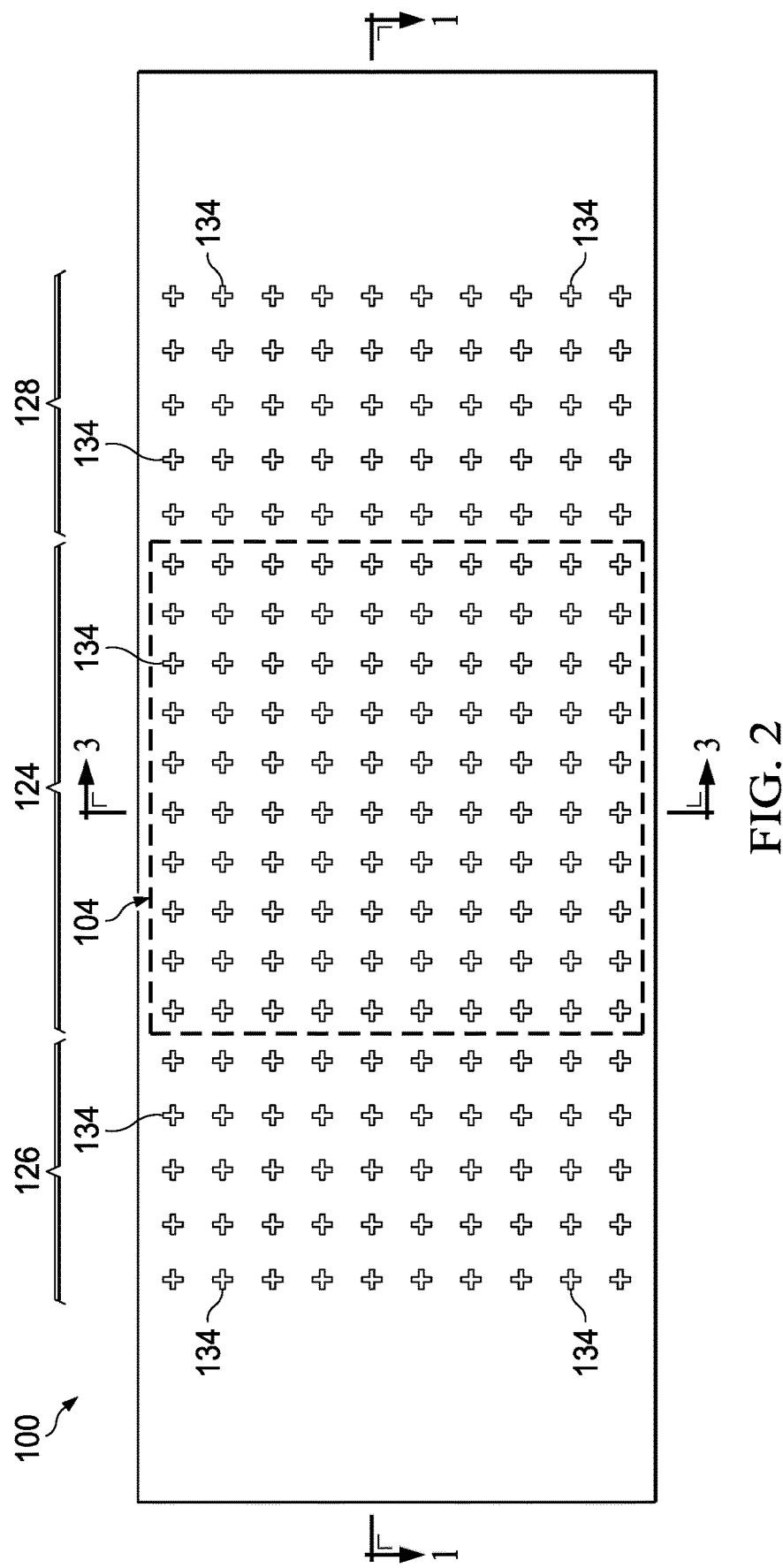
FIG. 2 is a top view of the example IR sensor structure of FIG. 1 taken along line 2-2 in FIG. 1.

The drawings are not necessarily to scale. Generally, the same reference numbers in the drawing(s) and this description refer to the same or like parts. Although the drawings show layers and regions with clean lines and boundaries, some or all of these lines and/or boundaries may be idealized. In reality, the boundaries and/or lines may be unobservable, blended and/or irregular.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. Notwithstanding the foregoing, in the case of a semiconductor device, "above" is not with reference to Earth, but instead is with reference to a bulk region of a base semiconductor substrate (such as a semiconductor wafer) on which components of an integrated circuit are formed. Specifically, as used herein, a first component of an integrated circuit is "above" a second component when the first component is farther away from the bulk region of the semiconductor substrate than the second component. As used in this patent, stating that any part (such as a layer, film, area, region, or plate) is in any way on (such as positioned on, located on, disposed on, or formed on, etc.) another part, indicates that the referenced part is either in contact with the other part, or that the referenced part is above the other part with one or more intermediate part(s) located therebetween.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, the phrase "in communication," including variations thereof, encompasses direct communication and/or indirect communication through one or more intermediary components, and does not require direct physical (such as wired) communication and/or constant communication, but rather additionally includes selective communication at periodic intervals, scheduled intervals, aperiodic intervals, and/or one-time events.

There are a number of different techniques that may be employed to detect infrared (IR) radiation in specific (narrow band) wavelengths. These different techniques include photon-based detection and thermal-based detection. Different types of thermal-based IR detectors include microbolometers, pyroelectric detectors, thermopiles, and microelectromechanical systems (MEMS) resonators. Examples disclosed herein involve the use of MEMS resonators (also referred to herein simply as mechanical resonators). Implementing IR detectors with mechanical resonators is advantageous because such resonators have relatively fast response times, are relatively small, can operate at different frequencies for flexibility of application, and can be manufactured at relatively low cost with large areas to facilitate the detection of multiple different wavelengths.

Mechanical resonators implemented in examples disclosed herein are solid state or unreleased resonators. As used herein, solid state or unreleased resonators are completely solid structures that do not rely on a resonant cavity or open space to facilitate oscillation. Rather, solid state or unreleased resonators, as disclosed herein, include a completely solid structure with periodically repeating components that are particularly dimensioned and spaced to confine mechanical vibrations within the solid structure. Due to the confinement of mechanical vibrations, the solid structure can function as a resonator that vibrates even though it is completely solid and surrounded by solid materials. Specifically, example mechanical resonators disclosed herein can be manufactured using standard complementary metal-oxide-semiconductor (CMOS) technology by which the solid state resonator is formed on a semiconductor (such as silicon) wafer during standard front-end-of-line (FEOL) processes and surrounded by silicon dioxide during back-end-of-line (BEOL) processes.

Mechanical resonators constructed in accordance with teachings disclosed herein vibrate at a very specific resonant frequency. However, the resonant frequency changes responsive to changes in the temperature of the resonators. The change in frequency arising from a change in temperature is how the mechanical resonator is employed as a thermal-based IR detector. More particular, example IR detectors disclosed herein include a plasmonic IR absorber (also referred to herein as an IR filter) that is monolithically integrated with a mechanical resonator during BEOL processing operations. The plasmonic IR absorber is implemented by a metasurface that includes an array of metal structures that are dimensioned and spaced to absorb a narrow band of IR radiation without absorbing IR radiation at wavelengths outside of the narrow band. Thus, if an IR beam includes wavelengths in the narrow band, the plasmonic IR absorber will quickly heat up. Due to the proximity of the plasmonic IR absorber to the mechanical resonator, the temperature of the resonator will also increase, thereby causing the resonant frequency of the resonator to change. By monitoring the shift in the resonate frequency of the resonator, the presence of IR radiation at the wavelength within the narrow band can be detected.

Advantageously, both the mechanical resonator and the plasmonic IR absorber disclosed herein are capable of being monolithically manufactured on a single wafer using standard CMOS technology. Furthermore, the mechanical resonator and the plasmonic IR absorber can be integrated with electronic circuitry that implements the logical processing and signal conditioning of the resonator and IR absorber. Thus, examples disclosed herein achieve a completely monolithic narrow-band IR detector with all components fully integrated on a single die to detect the shift in resonant frequency of the resonator and, thereby, determine the presence of a particular wavelength of IR radiation. The monolithic integration of these components on a single die using standard CMOS processes advantageously reduces the costs and complexity of manufacturing IR detectors and enables the manufacture of IR detectors that are smaller in size than other existing detectors. Furthermore, the close proximity of the mechanical resonator and the plasmonic IR absorber made possible by the monolithic integration of the components also enables faster response times with smaller time constants, and lower parasitics, which enables a reduction in power consumption relative to other existing detectors.

Figure 3:
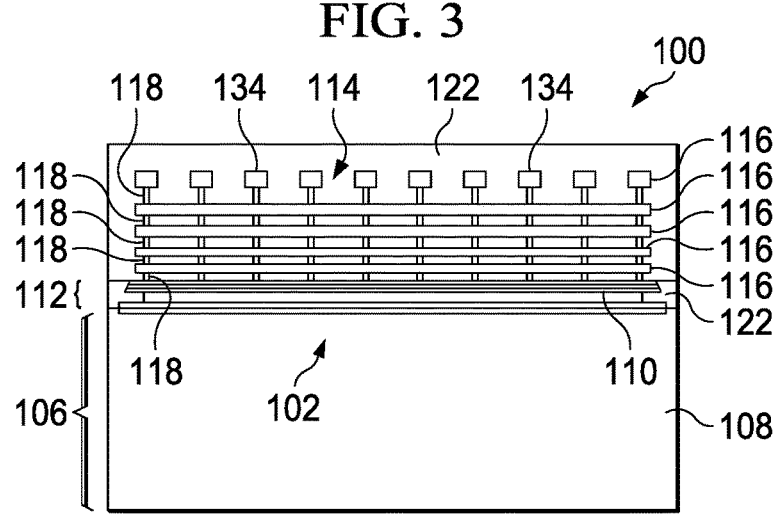
FIG. 3 is a cross-sectional view of the example IR sensor structure of FIGS. 1 and 2 taken along line 3-3 in FIG. 2.

FIGS. 1-3 show three different views of an example IR sensor structure 100 constructed in accordance with teachings disclosed herein. Specifically, FIG. 1 is a cross-sectional view of the example IR sensor structure 100 taken along line 1-1 in FIG. 2, FIG. 2 is a top view of the example IR sensor structure 100 taken along line 2-2 in FIG. 1, and FIG. 3 is a cross-sectional view of the example IR sensor structure 100 taken along line 3-3 in FIG. 2. As shown in the illustrated example of FIG. 1, the IR sensor structure 100 includes a mechanical resonator 102 and a plasmonic IR absorber 104 that are monolithically integrated on a substrate 106. In some examples, the substrate 106 is made of any suitable semiconductor material 108 such as silicon.

In this example, the mechanical resonator 102 includes an array of capacitors 110 fabricated during front-end-of-line (FEOL) processing as represented by its location within a FEOL processing layer 112. In some examples, the capacitors 110 are constructed in the same manner as ferroelectric capacitors commonly used to implement ferroelectric random access memory (FeRAM) in CMOS memory chips. However, in some examples, whereas typical FeRAM capacitors are made from lead zirconate titanate (PZT), the capacitors 110 of the illustrated example include a piezoelectric layer. Other types of capacitors may also be used such as those made of pure dielectric materials. Each of the capacitors 110 of the illustrated example is coupled to a corresponding metal interconnect 114 that is aligned with and extends away from the corresponding capacitor 110. In this example, the interconnects 114 extend through five separate metallization layers 116. In other examples, the interconnects 114 may extend through more or fewer metallization layers 116 than the five shown in FIG. 1. As shown in FIG. 1, the metal in the separate metallization layers 116 of each interconnect 114 of each capacitor 110 is connected by metal vias 118 extending therebetween. In some examples, the metal in the metallization layers 116 and the vias 118 is copper that is added during back-end-of-line (BEOL) processing as represented by their location within a BEOL processing layer 120. In some examples, the capacitors 110 in the FEOL processing layer 112 and the interconnects 114 in the BEOL processing layer 120 are surrounded by a dielectric material 122 (such as silicon dioxide) to form a completely solid structure (that is, an unreleased structure that does not include any stress relief openings or resonant cavities).

It has been shown that the periodic arrangement of capacitors 110, as shown in FIG. 1, enables the generation of stress and strain within the solid structure of the IR sensor structure 100 that results in travelling and evanescent waves. An evanescent field, or evanescent wave, is an oscillating field that does not propagate but whose energy is spatially concentrated in the vicinity of the source. The nature of the particular waves produced by the capacitors 110 and their propagation through the capacitors 110 and surrounding structure depends on the design and spacing (pitch) of the capacitors 110 as well as the material properties of the capacitors 110 and the surrounding structure. More particularly, in some examples, the capacitors 110 are designed and spaced to create a slow wave containment structure that contains slow waves (such as waves below a threshold velocity) within the vicinity of the capacitors 110. That is, while fast waves (such as above a threshold velocity) may propagate and escape up through the dielectric material 122 or down through the semiconductor material 108, at least some slower waves will not be able to propagate away from the capacitors 110 but will be reflected back by both the bulk semiconductor material 108 and the bulk dielectric material 122. Thus, this slow wave containment structure effectively becomes a waveguide that traps the waves near the surface of the semiconductor substrate 106 in which the propagation of such waves is limited in a direction generally parallel to the surface of the substrate 106.

While the bulk semiconductor material 108 and the bulk dielectric material 122 block the propagation of waves in a direction perpendicular to the array of capacitors 110, it is still possible for waves to propagate in a direction parallel to the array of capacitors 110. However, in this example, the array of capacitors 110 includes a wave containment region 124 that is positioned between two reflector regions 126, 128. The capacitors 110 within the wave containment region 124 differ from the capacitors 110 in the reflector regions 126, 128 based on the pitch or spacing between adjacent ones of the capacitors 110. More particularly, as shown in the illustrated example, the capacitors 110 within the wave containment region 124 are spaced at a first pitch 130, and the capacitors 110 in the reflector regions 126, 128 are spaced at a second pitch 132 that is greater than first pitch 130. The larger spacing of the capacitors 110 in the reflector regions 126, 128 inhibits waves from propagating in a direction parallel to the linear array of the capacitors 110, but instead reflects the waves back toward the wave containment region 124. As a result, the waves produced by the capacitors are unable to escape the vicinity of the capacitors 110 but are contained in place within the solid structure associated with and in the immediate vicinity of the capacitors 110 in the wave containment region 124. That is, the particular arrangement of the capacitors 110 as shown and described completely confines waves such that they cannot propagate either in a direction transverse to the surface of the substrate 106 (due to slow wave containment structure of the wave containment region 124) or in a direction parallel to the surface of the substrate 106 (due to the reflector regions 126, 128). This complete confinement of such waves creates a resonance cavity.

Notably, the second pitch 132 of the capacitors 110 in the reflector regions 126, 128 is only slightly larger than the first pitch 130 of the capacitors 110 in the wave containment region 124 because spacing the capacitors too far apart in the reflector regions 126, 128 would allow the waves to escape through the bulk semiconductor material 108 and/or the bulk dielectric material 122. Thus, in some examples, the second pitch 132 is between 10% and 50% greater than the first pitch 130. In the illustrated example of FIG. 1, the spacing of the capacitors 110 within each of the regions 124, 126, 128 is uniform across each respective region. In other examples, the spacing of the capacitors 110 in the reflector regions 126, 128 may be non-uniform.

FIG. 4 illustrates an example stress profile across the IR sensor structure 100 of FIG. 1 at a particular point in time while the capacitors 110 are being excited to produce waves that are contained within the wave containment region 124. The stress profile shown in FIG. 4 is generated based on finite element analysis. In the illustrated example, additional dielectric material 402 is added above the dielectric material 122 of the BEOL processing layer 120 shown in FIG. 1 to facilitate the finite element analysis by assuming the bulk regions above and below the capacitors 110 extend outward indefinitely, thereby eliminating any reflections back to the resonance cavity. As shown in FIG. 4, the stress profile of each individual capacitor 110 includes a positive stress region 404 (represented by the dark shaded areas) and a corresponding negative stress region 406 (represented by the light shaded areas) with the corresponding regions 404, 406 extending in opposite directions towards the bulk regions of the IR sensor structure 100 above and below the capacitors 110. The stress regions 404, 406 extend only so far into the bulk regions because the waves producing the stress are unable to propagate into the bulk regions. The direction in which the positive and negative stress regions 404, 406 for each capacitor 110 extend is inverted relative to the immediately adjacent ones of the capacitors 110 to produce an alternating pattern as shown in the illustrated example. Further, as shown in the illustrated example, the stress regions 404, 406 become attenuated and substantially disappear in connection with the capacitors 110 in the reflector regions 126, 128 because, as noted above, waves producing the stress in the reflector regions 126, 128 are reflected back toward the center rather than propagating outward.

Notably, the stress profile represented in FIG. 4 corresponds to the stress at a particular point in time. As the contained waves propagate within the structure, thereby causing the structure to vibrate, the stress will increase to a maximum and then decrease until the stress profile inverts itself with the areas of positive stress regions 404 in FIG. 4 becoming negative stress regions and the areas of negative stress regions 406 in FIG. 4 becoming positive stress regions. The stress in this inverted state will increase until reaching a maximum at which point the process will reverse, thereby enabling the structure to function as a completely solid mechanical resonator. The frequency at which these internal vibrations of the solid structure oscillate corresponds to the resonant frequency of mechanical resonator 102. Further, the particular resonant frequency of any given mechanical resonator 102 constructed in accordance with teachings disclosed herein is a function of the spacing (pitch) of the capacitors 110 within the wave containment region 124. That is, the mechanical resonator 102 can be designed with a particular resonant frequency by defining a particular pitch for the capacitors 110. Further detail regarding the design and construction of the capacitors 110 to create the mechanical resonator 102 is provided in U.S. Patent Application No. 2021/0099237, which is hereby incorporated herein by reference in its entirety.

The number of capacitors 110 in the wave containment region 124 (ten capacitors) and in each of the reflector regions 126, 128 (five capacitors) shown in FIGS. 1 and 4 is by way of example. In other examples, there may be more or fewer capacitors 110 in the different regions 124, 126, 128. However, inasmuch as the wave containment region 124 is where stresses and strains oscillate as contained within the mechanical resonator 102, the number of capacitors 110 in the wave containment region 124 will typically be significantly higher than the number of capacitors 110 in the reflector regions 126, 128. In other examples, the number of capacitors 110 in the reflector regions 126, 128 may be similar to or even greater than the number of capacitors in the wave containment region 124.

In the illustrated example of FIG. 1, the uppermost metallization layer 116 (such as the metallization layer 116 farthest from the capacitors 110) includes metal structures 134 that are sized, shaped, and arranged to form a metasurface that functions as the plasmonic IR absorber 104. Generally speaking, the construction of a metasurface that functions as a plasmonic IR absorber (that absorbs IR radiation in a particular narrow wavelength band but does not absorb wavelengths outside of the narrow band) involves arranging a two-dimensional array of metal structures of a particular size and shape by a particular pitch relative to the particular wavelength to be absorbed. That is, by changing the size and shape of the metal structures and/or the pitch at which the metal structures are spaced apart in a metasurface, different plasmonic IR absorbers can be manufactured that are designed to detect (absorb) different wavelengths of IR radiation.

The arrangement of the metal structures 134 of the example plasmonic IR absorber 104 are shown in the top view of the illustrated example of FIG. 2. In the illustrated example of FIG. 2, the plasmonic IR absorber 104 corresponds to a 10×10 array of the metal structures 134 in a central region corresponding to the wave containment region 124. The additional metal structures 134 of the reflector regions 126, 128 are not part of the plasmonic IR absorber (and will not absorb the intended wavelength of IR radiation) because they are not spaced at the same pitch as the metal structures 134 of the wave containment region 124. The difference in pitch between the metal structures 134 in the different regions 124, 126, 128 arises from the fact that the capacitors 110 are at different pitches in the different regions 124, 126, 128, as outlined above. More particularly, as shown in the illustrated example of FIG. 1, each metal structure 134 is aligned with a corresponding capacitor 110 and, as described above, the capacitors 110 in the wave containment region 124 are arranged with a slightly smaller pitch than the capacitors 110 in the reflector regions 126, 128. As a result, the metal structures 134 in the wave containment region 124 are also arranged with a slightly smaller pitch than the metal structures 134 in the reflector regions 126, 128.

The pitch (or spacing), shape, and size of the metal structures 134 are important parameters defining the particular wavelength and bandwidth at which the IR signal is absorbed by the plasmonic IR absorber 104. That is, the desired wavelength and bandwidth of IR radiation to be detected by an IR detector containing a particular IR absorber 104 is a driving design consideration in defining the pitch, shape, and size of the metal structures 134. Accordingly, inasmuch as the metal structures are aligned with the underlying capacitors 110 of the mechanical resonator 102 in the illustrated example, the desired wavelength and bandwidth of IR radiation to be detected also define the pitch shape, and size of the capacitors 110 within the wave containment region 124. Further, as described above, the pitch, shape, and size of the capacitors 110 within the wave containment region 124 are driving design considerations in defining the pitch, shape, and size of the capacitors 110 in the reflector regions 126, 128 because such capacitors 110 are to be spaced only slightly (10-50%) farther apart than the capacitors 110 in the wave containment region 124.

As noted above, the larger pitch for the capacitors in the reflector regions 126, 128 result in a correspondingly larger pitch for the metal structures 134 in the reflector regions 126, 128. As a result, these metal structures 134 will not absorb the intended wavelength of IR radiation. In some instances, such metal structures 134 may absorb a different wavelength of IR radiation, which may degrade the precision of the IR sensor structure 100. Accordingly, in some examples, the metal in the uppermost metallization layer 116 corresponding to the metal structures 134 in the reflector regions 126, 128 is omitted.

The above design constraints and relationships between the pitches of the metal structures 134 and the capacitors 110 assumes that the metal structures 134 are aligned with the capacitors 110. Alignment of the metal structures 134 with the capacitors 110 is done to simplify the manufacturing process with successive ones of the metallization layers 116 having the same pattern as the previous layers. However, the alignment of the metal structures 134 with the capacitors 110 is not necessary for the IR sensor structure 100 to function. In some examples, at least some of the metal structures 134 of the plasmonic IR absorber 104 are not aligned with the underlying capacitors 110. Indeed, it is not necessary for any of the metal structures 134 to align with the capacitors 110. As a result, it is possible to define the pitch, shape, and size of the metal structures 134 completely independently of the pitch, shape, and size of the capacitors 110. As a result, in some examples, all of the metal structures 134 at the uppermost metallization layer 116, including those in the reflector regions 126, 128, may be part of the plasmonic IR absorber (rather than just those in the wave containment region 124 as shown in FIG. 1) because all of the metal structures 134 can be spaced apart by the same consistent pitch, regardless of the spacing of the underlying capacitors 110.

As shown in the illustrated example of FIG. 2, the metal structures 134 are in the shape of a plus ("+") sign. In other examples, the shape of the metal structures 134 can be circular, square, and/or any other suitable shape. Further, while the metal structures 134 of the plasmonic IR absorber 104 are arranged in a 10×10 two-dimensional array. The array may be any suitable size with any suitable number of metal structures 134 in each of the two dimensions. Likewise, the metal structures 134 in the reflector regions 126, 128 may cover any suitable area. Further, in some examples, the metal structures 134 in the reflector regions 126, 128 may be omitted inasmuch as they do not contribute to the plasmonic IR absorber 104.

FIG. 3 is a cross-sectional view of the example IR sensor structure 100 taken along a length of one of the capacitors 110 to show a full profile of one of the interconnects 114. As shown in the illustrated example, the capacitors 110 are elongate in a direction perpendicular to the linear arrangement of the capacitors 110 shown in FIG. 1. More particularly, the elongate length of the capacitor 110 corresponds to the number and spacing of the metal structures 134 in the direction parallel with the elongate length of the capacitor 110. Thus, in this example, the capacitor 110 is long enough to extend the distance of the ten metal structures 134 distributed along its length at the particular pitch corresponding to the intended wavelength of IR radiation to be detected as discussed above.

In the illustrated example of FIG. 3, the metal in each of the metallization layers 116 of the interconnect 114 below the uppermost layer (corresponding to the metal structures 134 of the plasmonic IR absorber 104) extend the full distance of the line of metal structures 134. By contrast, in this example, the vias 118 are isolated and aligned with respective ones of the metal structures 134. The example structure of the interconnect 114 shown in FIG. 3 is provided by way of example and any other suitable design is possible. For instance, in some examples, the metal in one or more layers of the vias 118 extend the full distance of the line of metal structures 134 similar to the lower metallization layers 116. In some examples, one or more of the lower metallization layers 116 do not extend the full distance of the line of metal structures 134 but are constructed with multiple isolated regions of metal.

In some examples, one or more of the vias 118 between adjacent metallization layers 116 may be omitted. Indeed, it is not necessary for the metal structures 134 of the plasmonic IR absorber to be in direct physical contact with the underlying metal. Thus, in some examples, the metal across an entire metallization layer 116 and/or an intermetal layer for the vias 118 may be omitted. That is, while interconnects 114 are typically added in the BEOL region to provide electrical connections between electrical components that is not the purpose of the full interconnect 114 shown in FIG. 3. Rather, the metal included in the interconnect 114 of FIG. 3 is to provide thermal conductance between the metal structures 134 (associated with the plasmonic IR absorber 104) and the underlying capacitors 110 (associated with the mechanical resonator 102). In particular, when IR radiation is present at the particular wavelength for which the plasmonic IR absorber 104 is designed, the IR absorber 104 will absorb the IR radiation and heat up. As the IR absorber 104 heats up, the heat will be conducted through the metal of the interconnect 114 towards the mechanical resonator 102 (such as the capacitors 110), thereby also heating up the resonator 102. The increasing temperature of the mechanical resonator 102 will cause a shift in the resonant frequency of the resonator 102, which can be detected to identify the presence of the IR radiation. The metal structures 134 of the plasmonic IR absorber 104 do not need to be in direct metallic contact with the rest of the interconnect 114 because heat is also able to pass through the dielectric material 122. However, a fully connected interconnect 114 facilitates faster heat transfer for a faster change in temperature of the mechanical resonator 102, thereby giving rise to a faster response time for the IR sensor structure 100.

Figure 5:
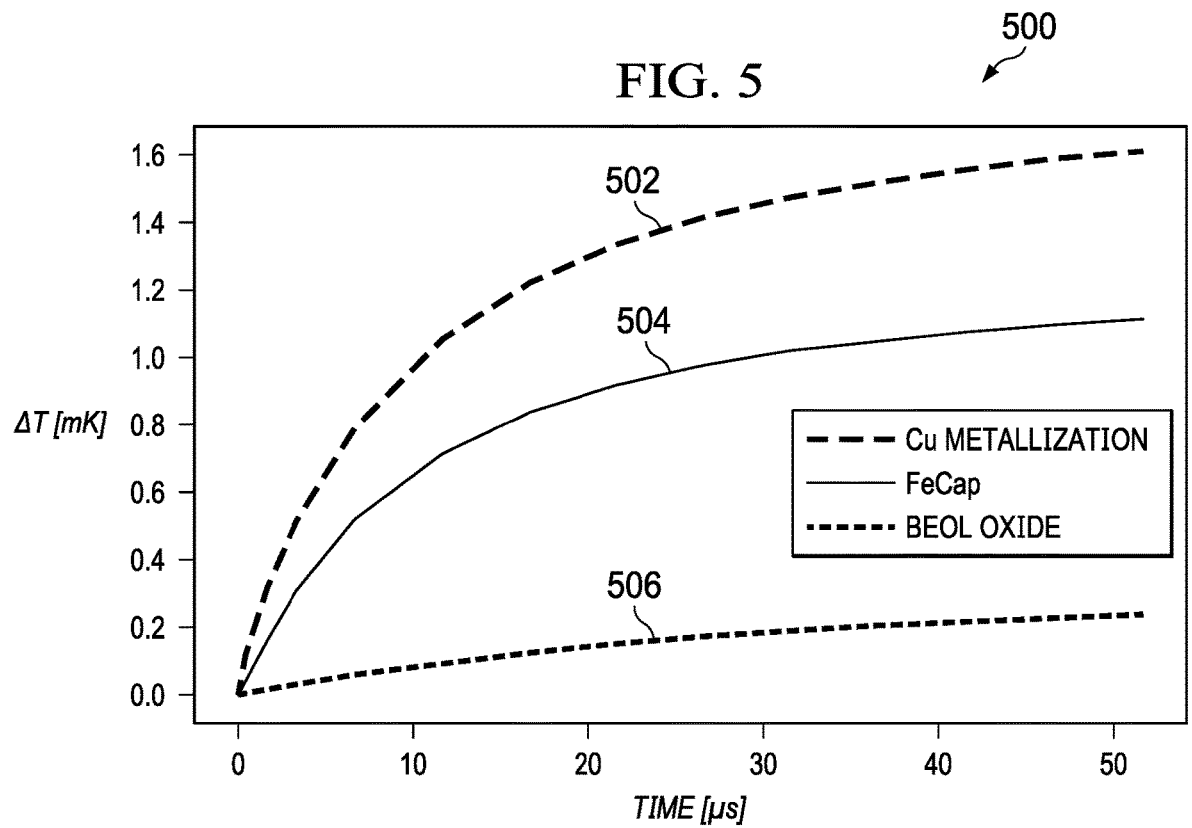
FIG. 5 is a graph showing the temperature change of different materials within an example IR sensor structure similar to the IR sensor structure of FIGS. 1-3 as the example plasmonic IR absorber absorbs IR radiation.

FIG. 5 is a graph 500 showing the temperature change of the different materials within an example IR sensor structure similar to the IR sensor structure 100 of FIGS. 1-3 as the plasmonic IR absorber 104 absorbs IR radiation. Specifically, the data represented in FIG. 5 corresponds to a 60 μm by 60 μm device that includes an array of 24 capacitors 110 in the wave containment region 124 and 5 capacitors 110 in each of the reflector regions 126, 128. As shown in the illustrated example, the top curve 502 represents the temperature change in the metal interconnect 114 (including the metal structures 134 of the IR absorber 104) over time, the middle curve 504 represents the temperature change of the capacitors 110 of the mechanical resonator 102, and the bottom curve 506 represents the bulk dielectric material 122 surrounding the mechanical resonator 102 and the IR absorber 104. As shown in the graph 500 of FIG. 5, the metal interconnect 114 and the capacitors 110 heat up very fast to provide a time constant of approximately 5 microseconds. Furthermore, as shown in the illustrated example, while the metal interconnect 114 and the capacitors 110 heat up very quickly, the dielectric heats up significantly more slowly. The relatively hot metal in the relatively cooler dielectric material creates thermal stress in the overall structure, thereby helping with the temperature coefficient of resonant frequency (TCF) for the mechanical resonator 102.

Figure 6:
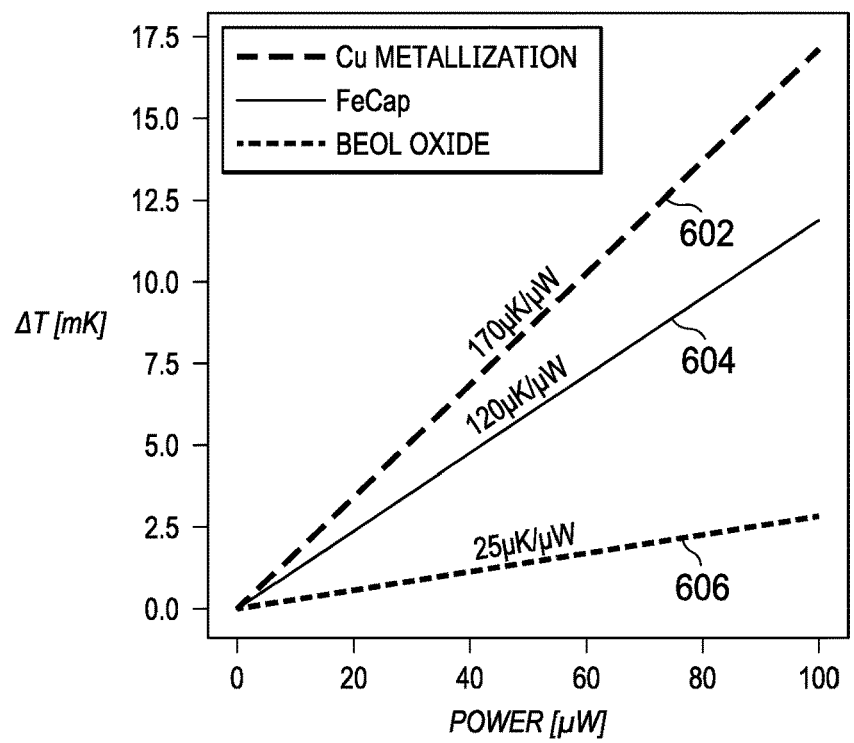
FIG. 6 is a graph showing the steady state temperature change of different materials within an example IR sensor structure similar to the IR sensor structure of FIGS. 1-3 as a function of the power of the incident IR radiation absorbed by the plasmonic IR absorber.
Figure 7:
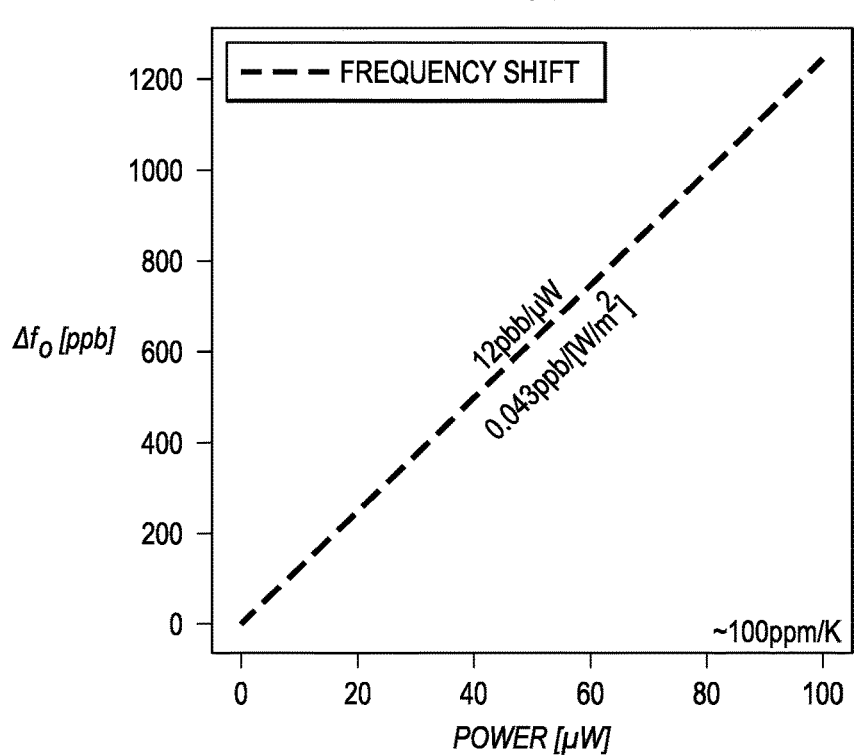
FIG. 7 is a graph showing the resulting frequency shift in the mechanical resonator in an example IR sensor structure due to the steady state temperature change represented in the graph of FIG. 6.

FIG. 6 is a graph 600 showing the steady state temperature change of the different materials within an example IR sensor structure as a function of the power of the incident IR radiation absorbed by the plasmonic IR absorber 104. As shown in the illustrated example, the top curve 502 represents the temperature change in the metal interconnect 114 (including the metal structures 134 of the IR absorber 104), the middle curve 504 represents the temperature change of the capacitors 110 of the mechanical resonator 102, and the bottom curve 506 represents the bulk dielectric material 122 surrounding the mechanical resonator 102 and the IR absorber 104. In this example, a temperature change is possible (in the metal interconnect 114) of approximately 170 μK for every μW of absorbed IR power. FIG. 7 is a graph 700 showing the resulting frequency shift in the mechanical resonator 102 due to the steady state temperature change represented in the graph 600 of FIG. 6. As shown in FIG. 7, examples disclosed herein are capable of producing approximately 12 parts per billion (ppb) of frequency shift for every μW of absorbed IR power, which is an ample change in frequency to be detectable.

Figure 8:
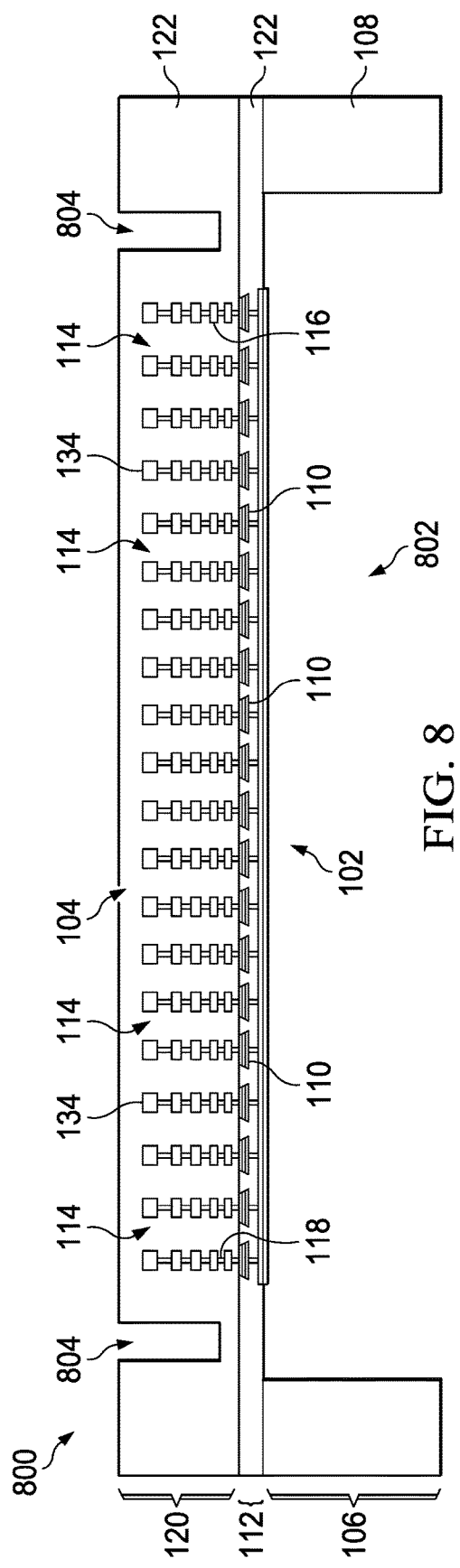
FIG. 8 is a cross-sectional view of another example IR sensor structure constructed in accordance with teachings disclosed herein.

FIG. 8 is a cross-sectional view of another example IR sensor structure 800 that includes a similarly designed mechanical resonator 102 and plasmonic IR absorber 104 as described above in connection with FIGS. 1-3. However, the example IR sensor structure 800 of FIG. 8 differs from the IR sensor structure 100 of FIGS. 1-3 in that the semiconductor material 108 of the substrate adjacent the capacitors 110 is removed to define a cavity 802 that extends beyond the full length of the array of the capacitors 110. Notably, the cavity 802 of FIG. 8 is not a resonant cavity needed to enable the mechanical resonator 102 to vibrate. Rather, the cavity 802 is included in the example IR sensor structure 800 of FIG. 8 to reduce heat transfer away from the mechanical resonator 102 as it is heated up in response to the plasmonic IR absorber 104 absorbing IR radiation. That is, by removing (such as via full back etching) the semiconductor material 108 in the area of the cavity 802 adjacent the array of capacitors 110, heat produced by the IR absorber 104 cannot pass into the bulk semiconductor region below the capacitors 110 and, therefore, heats up the mechanical resonator 102 to a greater extent and/or at a faster rate.

The example IR sensor structure 800 of FIG. 8 also differs from the IR sensor structure 100 of FIGS. 1-3 in that trenches 804 are etched into the bulk region of the dielectric material 122 in the BEOL processing layer 120 adjacent the interconnects 114. The trenches 804 reduce a full thickness of the dielectric material 122 in the BEOL processing layer 120 to reduce lateral heat transfer into the surrounding BEOL processing layer 120 adjacent the interconnects 114. As a result, heat produced by the plasmonic IR absorber 104 absorbing IR radiation will heat the mechanical resonator 102 to a greater extent and/or at a faster speed.

Figure 9:
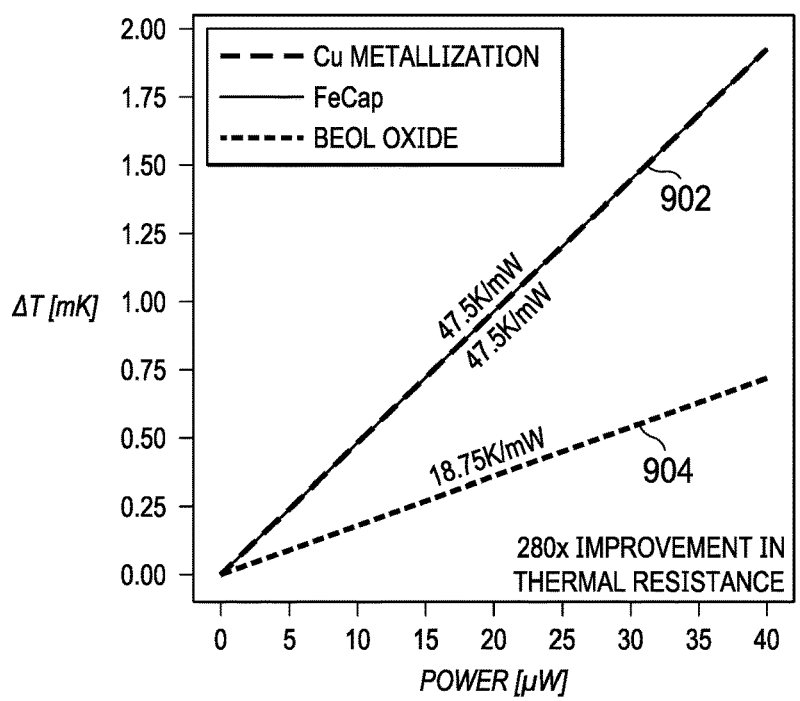
FIG. 9 is a graph showing the steady state temperature change of different materials within an example IR sensor structure similar to the IR sensor structure of FIG. 8 as a function of the power of the incident IR radiation absorbed by the plasmonic IR absorber 104.
Figure 10:
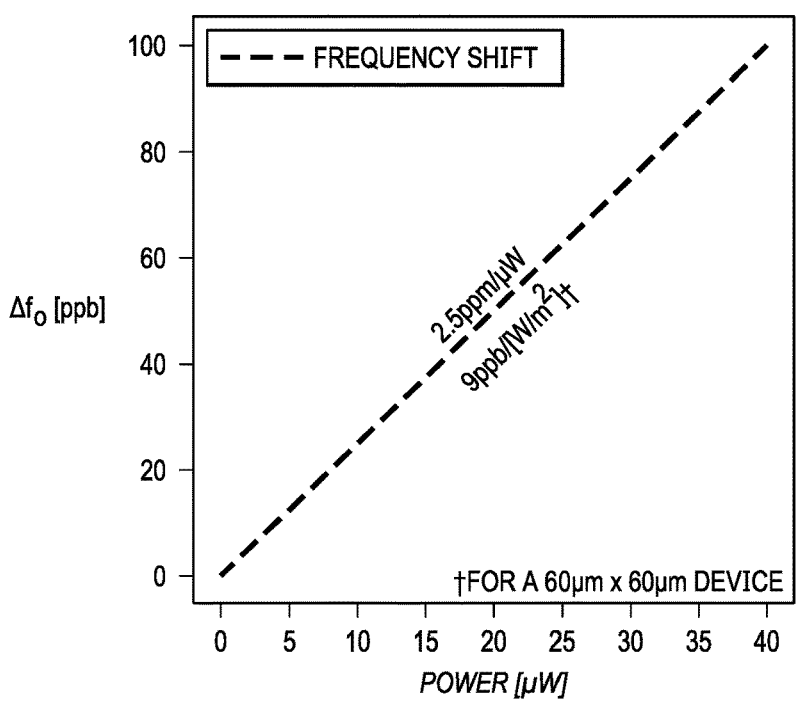
FIG. 10 is a graph showing the resulting frequency shift in the mechanical resonator in an example IR sensor structure due to the steady state temperature change represented in the graph of FIG. 9.

FIG. 9 is a graph 900 showing the steady state temperature change of the different materials within an example IR sensor structure with a design similar to the IR sensor structure 800 of FIG. 8 as a function of the power of the incident IR radiation absorbed by the plasmonic IR absorber 104. In this example, the temperature change in the metal interconnect 114 (including the metal structures 134 of the IR absorber 104) and in the capacitors 110 are approximately the same at 47.5 K for every mW of IR power absorbed as represented by the upper curve 902. Notably, the reduction in thermal conductance by the inclusion of the cavity 802 and the trenches 804 in FIG. 8 results in the steady state temperature change to IR power absorbed increasing approximately 280 times relative to the 170 µK/µW shown in the graph 600 of FIG. 6. The lower curve 904 of FIG. 9 represents the temperature change in the bulk dielectric material 122 surrounding the mechanical resonator 102 and the IR absorber 104. FIG. 10 is a graph 1000 showing the resulting frequency shift in the mechanical resonator 102 due to the steady state temperature change represented in the graph 900 of FIG. 9. As shown in FIG. 10, examples disclosed herein are capable of producing approximately 2.5 parts per million (ppm) of frequency shift for every µW of absorbed IR power, which is a significant improvement over the 12 ppb/µW shown in the graph 700 of FIG. 7.

Figure 11:
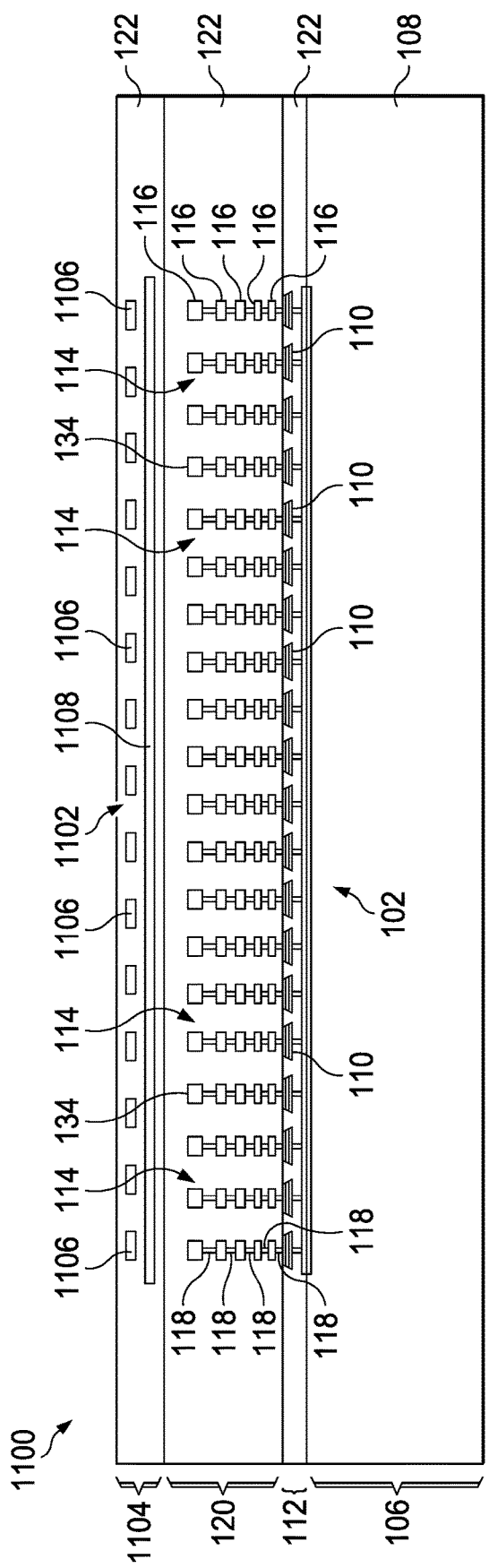
FIG. 11 is a cross-sectional view of another example IR sensor structure constructed in accordance with teachings disclosed herein.

FIG. 11 is a cross-sectional view of another example IR sensor structure 1100 that includes a similar mechanical resonator 102 and similar interconnect 114 as described above in connection with FIGS. 1-3. However, the example IR sensor structure 1100 of FIG. 11 differs from the IR sensor structure 100 of FIGS. 1-3 in that an independent plasmonic IR absorber 1102 is formed in an additional layer 1104 of the dielectric material 122 above the BEOL processing layer 120. In this example, the plasmonic IR absorber 1102 includes an array of metal structures 1106 with a particular geometry (such as size and shape) and spacing (pitch) to absorb IR radiation at a particular wavelength as described above. The metal structures 1106 of the example plasmonic IR absorber 1102 of FIG. 11 are not aligned with the capacitors 110 of the mechanical resonator 102 as are the metal structures 134 in the IR absorber 104 shown in FIG. 1. As such, in the example of FIG. 11, the spacing (or pitch), size, and/or shape of the capacitors 110 does not need to be tied to the spacing (or pitch), size, and/or shape of the metal structures 1106 of the plasmonic IR absorber 104. Further, in some examples, the metal structures 134 in the interconnects 114 that are aligned with the capacitors 110 may have a different geometry and/or spacing than what is described in connection with FIGS. 1-3 such that the metal structures 134 do not function as an IR absorber. That is, in the example of FIG. 11, only the metal structures 1106 in the additional layer 1104 of dielectric material 122 are designed as a metasurface that functions as a plasmonic IR absorber.

Inasmuch as the plasmonic IR absorber 1102 of FIG. 2 is designed independent of the design of the mechanical resonator 102, the particular shape and/or design of the interconnects 114 is not particularly relevant to the operation of either component. As such, one or more of the interconnects 114, one or more of the individual metallization layers 116, and/or one or more of the vias 118 may be omitted and/or constructed with a different design. In some examples, the interconnects 114 are still included to facilitate thermal conductance between the plasmonic IR absorber 1102 and the underlying capacitors 110. In some examples, to further facilitate heat transfer, the example IR sensor structure 1100 of FIG. 11 includes a metal plate 1108 between the metal structures 1106 of the plasmonic IR absorber 1102 and the interconnects 114. In some examples, the metal plate 1108 covers an area corresponding to the two-dimensional arrangement of the metal structures 1106. In some examples, the metal plate 1108 is omitted.

As noted above, in the illustrated example of FIG. 11, the plasmonic IR absorber 1102 is formed in an additional layer 1104 of the dielectric material 122 deposited after the BEOL processing layer 120 is completed. In other examples, the plasmonic IR absorber 1102 is formed in ones of the upper metallization layers 116 such that the additional layer 1104 of dielectric material 122 can be omitted.

Figure 12:
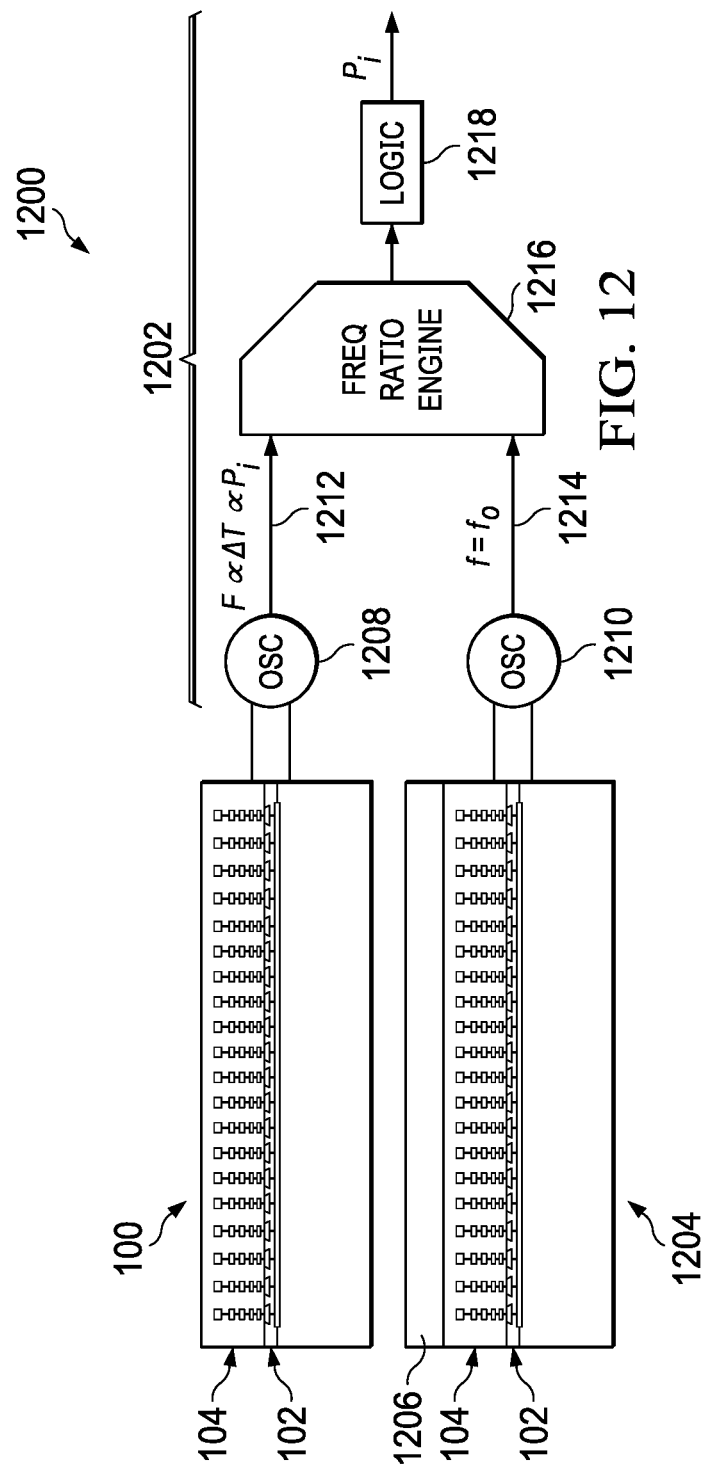
FIG. 12 illustrates an example IR detector that includes the example IR sensor structure of FIGS. 1-3.

FIG. 12 illustrates an example IR detector 1200 that includes the example IR sensor structure 100 of FIGS. 1-3 operatively coupled to electronic circuitry 1202. Although the IR detector 1200 of FIG. 12 is shown and described in connection with the IR sensor structure 100 of FIGS. 1-3, either of the IR sensor structures 800, 1100 shown and described in connection with FIGS. 8 and 11 can alternatively be used in place of the IR sensor structure 100 of FIGS. 1-3. As discussed above, when the plasmonic IR absorber 104 absorbs IR radiation, the absorber 104 begins to heat up, which in turn causes the mechanical resonator 102 to heat up. The change in temperature of the mechanical resonator 102 produces a shift in the resonant frequency of the resonator 102. The shift in the resonant frequency (f) is proportionate to the change in temperature ($\Delta T$), which is proportionate to the amount of power of incident IR radiation ($P_i$) absorbed by the plasmonic IR absorber 104. Accordingly, in this example, the electronic circuitry 1202 monitors the change in frequency of the mechanical resonator 102 to calculate or determine the amount of IR radiation absorbed by the plasmonic IR absorber 104. Inasmuch as the plasmonic IR absorber 104 is designed with a narrow absorption spectrum, when a shift in frequency is detected, the presence of IR radiation at the corresponding wavelength can be inferred. Detection of a particular wavelength of IR radiation can, in turn, be used to determine the presence of a particular gas.

While a change in frequency may be proportionate to a change in temperature, not all temperature changes are due to IR absorption. For instance, the ambient temperature surrounding the IR detector 1200 can change, which can affect the resonant frequency of the mechanical resonator 102. Furthermore, mechanical stress (such as packaging stress) and/or other factors (such as aging) independent of temperature can also contribute to changes in the resonant frequency of the resonator 102 that can confound measurements of the contribution of IR radiation incident on the plasmonic IR absorber 104. Accordingly, in some examples, the IR detector 1200 includes a reference IR sensor structure 1204 to provide a frame of reference for external factors that may be contributing to changes in the resonant frequency of the mechanical resonator 102 unrelated to IR radiation being absorbed by the plasmonic IR absorber 104 of the IR sensor structure 100. For purposes of explanation, the plasmonic IR absorber 104 in the first IR sensor structure 100 is referred to as a measuring IR sensor structure 100 to distinguish it from the reference IR sensor structure 1204.

In some examples, the reference IR sensor structure 1204 is designed and constructed in the same manner as the measuring IR sensor structure 100 to include a corresponding mechanical resonator 102 and a corresponding plasmonic IR absorber 104. More particularly, in some examples, the construction of the reference IR sensor structure 1204 is intended to exactly match (as far as possible) the construction of the measuring IR sensor structure 100 so that both structures exhibit the same frequency shift when subject to the same external factors including IR radiation, changes in ambient temperature, mechanical stress, etc. While both sensor structures 100, 1204 are designed and constructed in the same manner, the reference IR sensor structure 1204 differs from the measuring IR sensor structure 100 in that the reference IR sensor structure 1204 is not sensitive to IR radiation. As a result, unlike to measuring IR sensor structure 100, the resonant frequency of the reference IR sensor structure 1204 is not affected by the absorption of IR radiation, including any IR radiation absorbed by the IR absorber 104 of the measuring IR sensor structure 100. In some examples, the reference IR sensor structure 1204 is not sensitive to IR radiation because the plasmonic IR absorber 104 is covered by a protective coating 1206 as shown in the illustrated example. The protective coating 1206 corresponds to any suitable layer of material that blocks or prevents IR radiation from reaching the underlying IR absorber 104 in the reference IR sensor structure 1204. In some examples, the protective coating 1206 blocks all wavelengths of IR radiation. In some examples, the protective coating 1206 blocks a portion of IR radiation that includes the narrow band of IR wavelength(s) that are absorbed by the plasmonic IR absorber 104. In some examples, the protective coating 1206 is an IR reflective material. In some examples, the protective coating 1206 surrounds the rest of the reference IR sensor structure 1204. In some examples, the protective coating 1206 corresponds to a packaging material of an integrated circuit (IC) for the IR detector 1200. In some examples, instead of including the protective coating 1206, the reference IR sensor structure 1204 is not sensitive to IR radiation because the metal interconnects 114 are modified so as to not form a metasurface that functions as a plasmonic IR absorber 104.

Inasmuch as the reference IR sensor structure 1204 is not sensitive to IR radiation, the mechanical resonator 102 within the reference IR sensor structure 1204 will not change frequency in the presence of IR radiation. As a result, any changes to the frequency of the resonator 102 can be attributed to other factors. By isolating the other factors that may contribute to a change in resonant frequency in this manner, the differences in frequency between both IR sensor structures 100, 1204 can be compared to determine the effect of any IR radiation on the measuring IR sensor structure 100 independent of the other factors. More particularly, as shown in the illustrated example of FIG. 12, the measuring and reference IR sensor structures 100, 1204 are electrically coupled to respective first and second oscillator 1208, 1210 to generate respective first and second outputs 1212, 1214 corresponding to the resonant frequencies of the respective mechanical resonators 102 in the IR sensor structures 100, 1204. In this example, the two outputs 1212, 1214 are provided to a frequency ratio engine 1216 that compares the two frequencies. The output of the comparison is then provided to logic circuitry 1218 to calculate the power of the IR radiation incident on the measuring IR sensor structure 100. In some examples, the electronic circuitry 1202 further includes logic circuitry to determine a gas indicated by the presence of IR radiation indicated by the calculated IR power. In other examples, the calculated IR power of the logic circuitry 1218 is provided to a separate device (such as a separate processor and/or microcontroller) external to but in communication with the IR detector 1200 to determine a gas indicated by the detection of the IR radiation.

In the illustrated example, the oscillators 1208, 1210, the frequency ratio engine 1216 and the logic circuitry 1218 of the electronic circuitry 1202 are all implemented as hardware circuitry that is manufactured using standard CMOS technology. In some examples, all of the components of the IR detector 1200 are monolithically integrated on a single semiconductor wafer (such as the substrate 106 of FIG. 1) using standard CMOS technology. That is, in some examples, the measuring IR sensor structure 100, the reference IR sensor structure 1204, and the electronic circuitry 1202 can all be integrated on a single semiconductor die. Not only are the components integrated on the same substrate, but they are manufactured at the same time during the same manufacturing processes. Monolithically manufacturing all of the components of the IR detector 1200 in this manner advantageously enables the reference IR sensor structure 1204 to be positioned relatively close to the measuring IR sensor structure 100 and subject to similar thermal and/or mechanical stresses (at the time of manufacture and thereafter) so as to closely match the conditions of the measuring IR sensor structure 100. In this manner, the reference IR sensor structure 1204 is a reliable reference source to cancel out factors affecting the measuring IR sensor structure 100 unrelated to incident IR radiation. Furthermore, integrating all of the components the IR detector 1200 in a monolithic manner advantageously enables the IR detector 1200 to have a much smaller size than would otherwise be possible.

While an example manner of implementing the IR detector 1200 is illustrated in FIG. 12, one or more of the elements, processes, and/or devices illustrated in FIG. 12 may be combined, divided, re-arranged, omitted, eliminated, and/or implemented in any other way. Further, in some examples, the first oscillator 1208, the second oscillator 1210, the frequency ration engine 1216, the logic circuitry 1218, and/or, more generally, the example electronic circuitry 1202 of FIG. 12, may be implemented by hardware, software, firmware, and/or any combination of hardware, software, and/or firmware. Thus, for example, any of the first oscillator 1208, the second oscillator 1210, the frequency ration engine 1216, the logic circuitry 1218, and/or, more generally, the example electronic circuitry 1202, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the first oscillator 1208, the second oscillator 1210, the frequency ration engine 1216, and/or the logic circuitry 1218 is/are hereby expressly defined to include a non-transitory computer readable storage device or storage disk such as a memory, a digital versatile disk (DVD), a compact disk (CD), a Blu-ray disk, etc., including the software and/or firmware. Further still, the example IR detector 1200 of FIG. 12 may include one or more elements, processes, and/or devices in addition to, or instead of, those illustrated in FIG. 12, and/or may include more than one of any or all of the illustrated elements, processes and devices.

Figure 13:
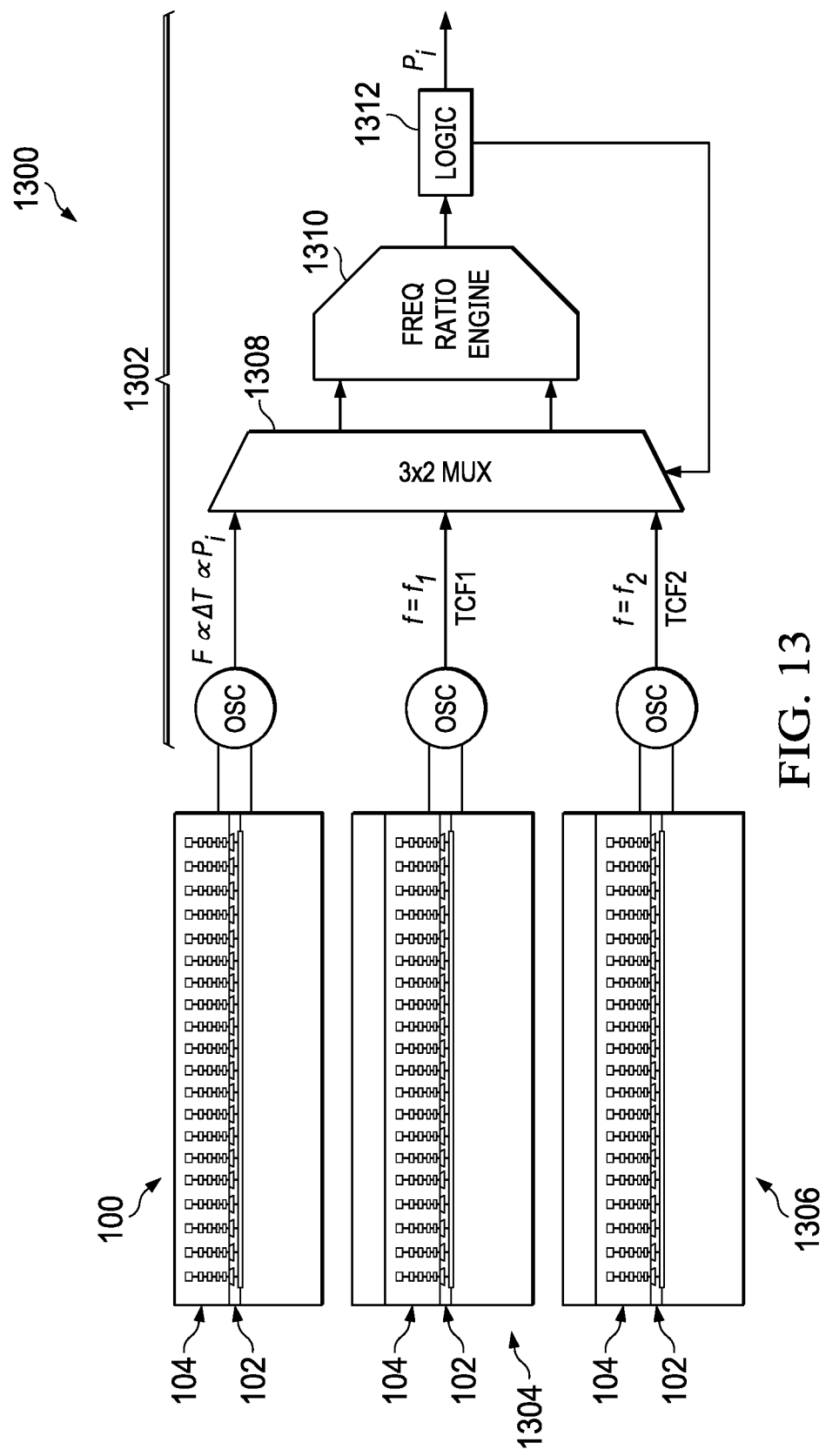
FIG. 13 illustrates another example IR detector that includes the example IR sensor structure of FIGS. 1-3.

FIG. 13 illustrates another example IR detector 1300 that includes the example IR sensor structure 100 of FIGS. 1-3 operatively coupled to electronic circuitry 1302. In contrast with the IR detector 1200 of FIG. 12, the example IR detector 1300 of FIG. 13 includes multiple reference IR sensor structures 1304, 1306. While two reference IR sensor structures 1304, 1306 are shown in the illustrated example of FIG. 13, the IR detector 1300 may include any suitable number of reference IR sensor structures 1304, 1306. In the illustrated example, the first reference IR sensor structure 1304 is designed and constructed to be the same as the measuring IR sensor structure 100. As a result, the first reference IR sensor structure 1304 has a similar resonant frequency to the measuring IR sensor structure 100 when no IR radiation is present. The first reference IR sensor structure 1304 can serve the same purpose as the reference IR sensor structure 1204 of FIG. 12. The second reference IR sensor structure 1306 of FIG. 13 is designed and constructed to be similar to the measuring IR sensor structure 100 but slightly different so as to have a slightly different temperature coefficient of resonant frequency (TCF) than the first reference IR sensor structure 1306. In some examples, the difference is achieved by slightly adjusting the pitch or spacing of the capacitors 110 in the second reference IR sensor structure 1306 relative to the first reference IR sensor structure 1304. As a result, the resonant frequency of the two reference IR sensor structures 1304, 1306 will change by a different amount in response to a change in temperature (such as ambient temperature). These differences in temperature (and resulting differences in resonant frequency) provide additional information that can be processed to determine additional conditions of the IR detectors 1300. For example, differences in the frequencies of the two reference IR sensor structures 1304, 1306 can be used to obtain an accurate measure of the ambient temperature. Such an accurate measurement of the ambient temperature can then be used to accurately determine the temperature of the measuring IR sensor structure 100 both when and when not exposed to IR radiation. Additionally or alternatively, in some examples, differences in the frequencies of the two reference IR sensor structures 1304, 1306 are compared to determine an amount of mechanical stress (such as packaging stress) experienced by the IR detector and, thus, experienced by the measuring IR sensor structure 100.

In the illustrated example of FIG. 13, the frequencies output by corresponding oscillators are input into a 3×2 multiplexer 1308 to produce two signals provided to a frequency ratio engine 1310. The frequency ratio engine compares the two signals to produce an output that is then processed by logic circuitry 1312 to estimate the IR power incident on the exposed measuring IR sensor structure 100. Further, as shown in the illustrated example, an output of the logic circuitry 1312 serves as a feedback to control the multiplexer 1308.

Figure 14:
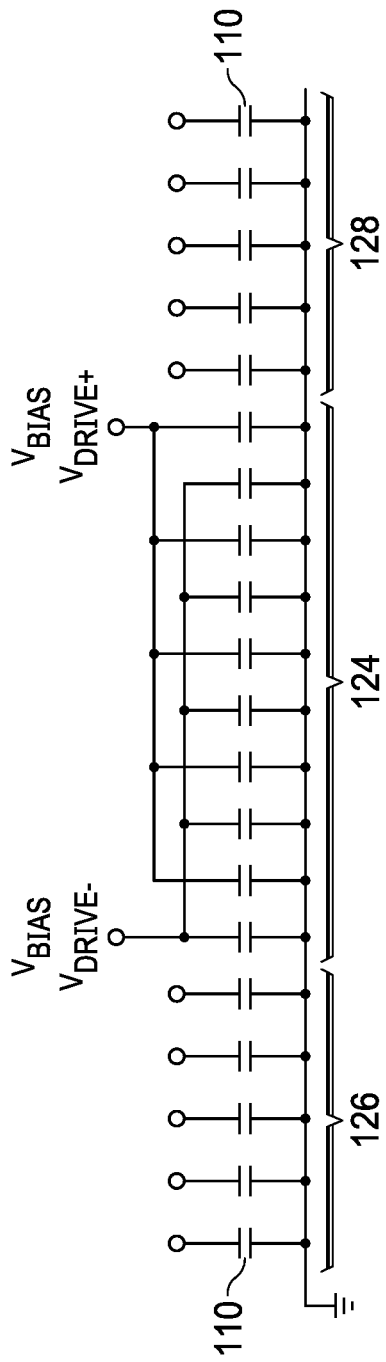
FIGS. 14-16 are schematic illustrations of various example electrical connection schemes for the capacitors of the IR sensor structure 100 within either of the IR detectors of FIG. 12 or 13.
Figure 15:
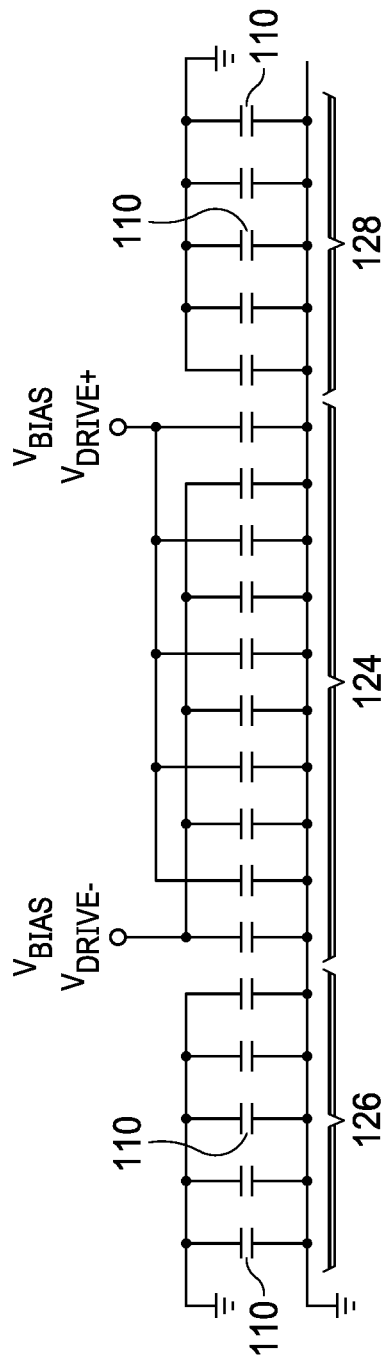
Figure 16:
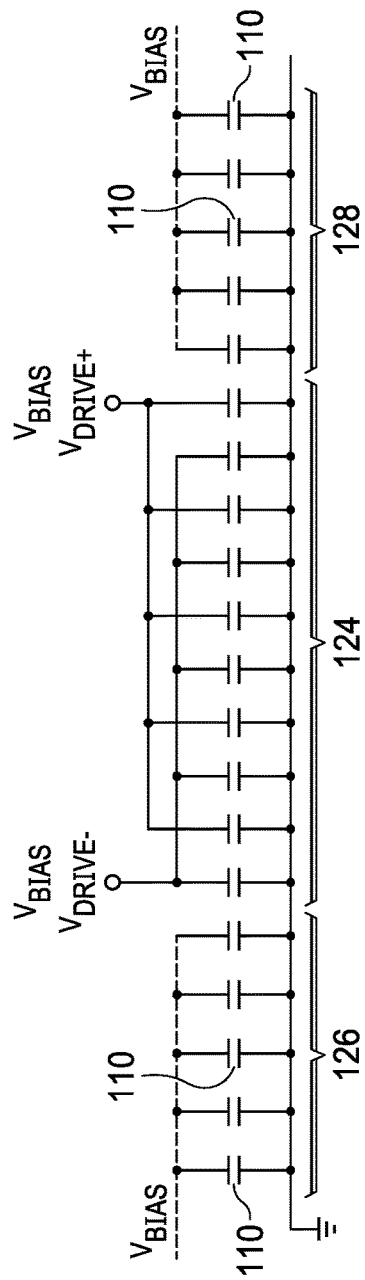

FIGS. 14-16 are schematic illustrations of various example electrical connection schemes for the capacitors 110 of the IR sensor structure 100 within either of the IR detectors 1200, 1400 of FIG. 12 or 13. In FIG. 14, the bottom plates of all capacitors 110 in the wave containment region 124 and both reflector regions 126, 128 are connected together and connected to a ground reference. The top plates of the capacitors 110 in the reflector regions 126, 128 are left floating. An excitation signal is applied to alternating ones of the upper plates of the capacitors 110 in the wave containment region 124. More particularly, a positive excitation signal Vdrive+ is applied to a first set capacitors corresponding to every other one of the capacitors 110 in the wave containment region 124, while a negative excitation signal Vdrive− is applied to a second set of capacitors corresponding to the capacitors 110 intervening between the first set of capacitors 110 in the wave containment region 124.

The electrical connection scheme of FIG. 15 is similar to FIG. 14 except that the top plates of the all the capacitors 110 in the reflector regions 126, 128 of FIG. 15 are connected to ground rather than left floating. The electrical connection scheme of FIG. 16 is also similar to FIG. 14 except that the top plates of the all the capacitors 110 in the reflector regions 126, 128 of FIG. 16 are connected to bias voltage reference.

In the illustrated examples of FIG. 14-16, the electrical connections are made using the interconnects 114 shown in FIG. 1. Thus, while the metal interconnects 114 do not need to be directly coupled to the metal structures 144 of the plasmonic IR absorber 104, as described above, at least some of the metallization layers 116 need to be in electrical contact with the capacitors 110 to form the complete circuits as shown in the illustrated examples.

Figure 17:
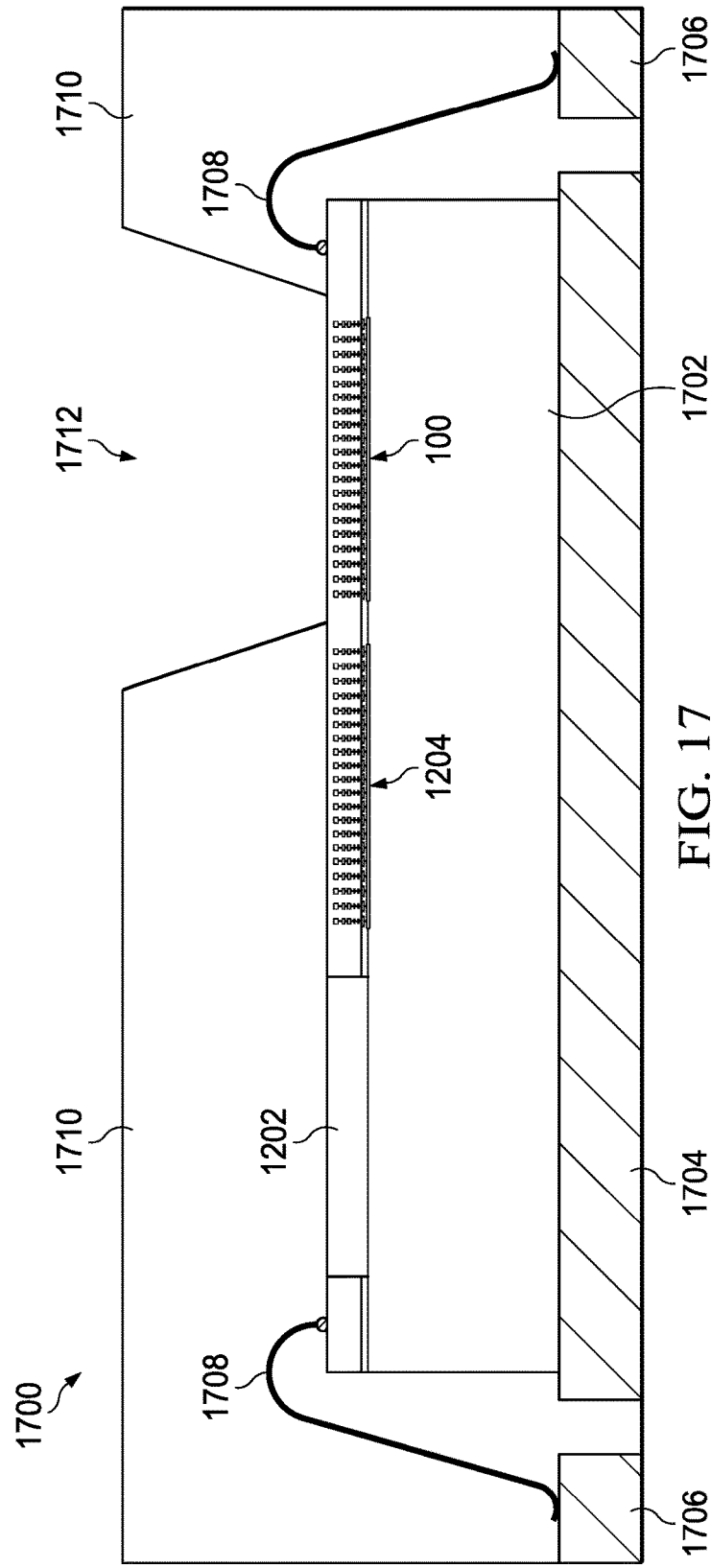
FIG. 17 is a cross-sectional view of an example IC package that includes the IR detector of FIG. 12.

FIG. 17 is a cross-sectional view of an example IC package 1700 that includes the IR detector 1200 of FIG. 12. A similar IC package could be manufactured to include the IR detector 1300 of FIG. 13. In the illustrated example of FIG. 17, the IC package 1700 is a standard quad flat no-leads (QFN) package that includes a semiconductor die 1702 that is mounted to a die attach pad 1704. The die attach pad 1704 is part of a leadframe that also includes bond pads 1706. The die 1702 is electrically coupled to the bond pads via wire bonds 1708. The die is encapsulated in a mold compound 1710 to form the outer shell of the IC package 1700.

As shown in the illustrated example, the semiconductor die 1702 includes the measuring IR sensor structure 100, the reference IR sensor structure 1204, and the electronic circuitry 1202. In this example, the reference IR sensor structure 1204 does not include a specific protective coating 1206 because the mold compound 1710 serves that purpose. For this reason, the mold compound 1710 includes an opening or cavity 1712 to expose the measuring IR sensor structure 100 to the external environment. In this manner, the plasmonic IR absorber 104 of the measuring IR sensor structure 100 is able to absorb IR radiation as outlined above.

Figure 18:
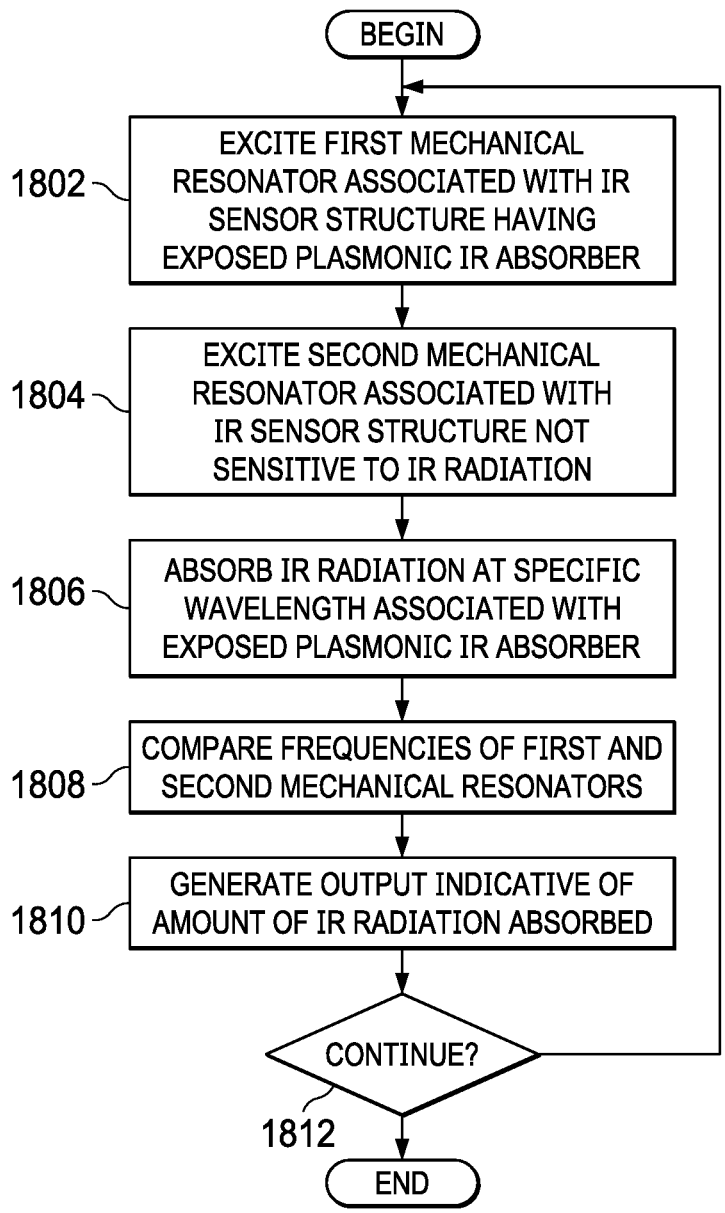
FIG. 18 is a flowchart setting forth an example method of operation of the example IR detector of FIG. 12.

FIG. 18 is a flowchart setting forth an example method of operation of the example IR detector of FIG. 12. Further, with the exception of block 1806 (which defines an inherently physical operation), the flowchart can be representative of example hardware logic circuitry, machine readable instructions, hardware implemented state machines, and/or any combination thereof for implementing the IR detector 1200 and, specifically, the electronic circuitry 1202 of FIG. 12. The machine readable instructions may be one or more executable programs or portion(s) of an executable program for execution by processor circuitry, such as the processor circuitry 1912 shown in the example processor platform 1900 discussed below in connection with FIG. 19 and/or the example processor circuitry discussed below in connection with FIGS. 20 and/or 21. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 18, many other methods of implementing the example IR detector 1200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 18 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media Turning in detail to FIG. 18, at block 1802 of the flowchart, a first oscillator (such as the first oscillator 1208 of FIG. 12) excites a first mechanical resonator (such as the first mechanical resonator 102 of FIG. 12) associated with an IR sensor structure (such as the measuring IR sensor structure 100 of FIG. 12) having an exposed plasmonic IR absorber (such as the plasmonic IR absorber 104). At block 1804, a second oscillator (such as the second oscillator 1210 of FIG. 12) excites a second mechanical resonator (such as the second mechanical resonator 102 of FIG. 12) associated with an IR sensor structure (such as the reference IR sensor structure 1204 of FIG. 12) that is not sensitive to IR radiation. At block 1806, the exposed plasmonic IR absorber 104 absorbs IR radiation at a specific wavelength associated with the exposed plasmonic IR absorber 104.

As the plasmonic IR absorber 104 absorbs IR radiation at the specific wavelength, the IR absorber 104 will rapidly increase in temperature and cause the first mechanical resonator 102 to correspondingly increase in temperature. This increase in temperature results in a shift in the resonant frequency of the first mechanical resonator 102. The amount of shift in the frequency is proportional to the amount of change in temperature, which is proportional to the amount (power) of IR radiation absorbed. At block 1808, the frequency ratio engine 1216 compares the frequencies of the first and second mechanical resonators. At block 1810, the logic circuitry 1218 generates an output indicative of an amount of IR radiation absorbed. At block 1812, it is determined whether to continue the process. If so, control returns to block 1802. Otherwise, the example process of FIG. 18 ends.

Figure 19:
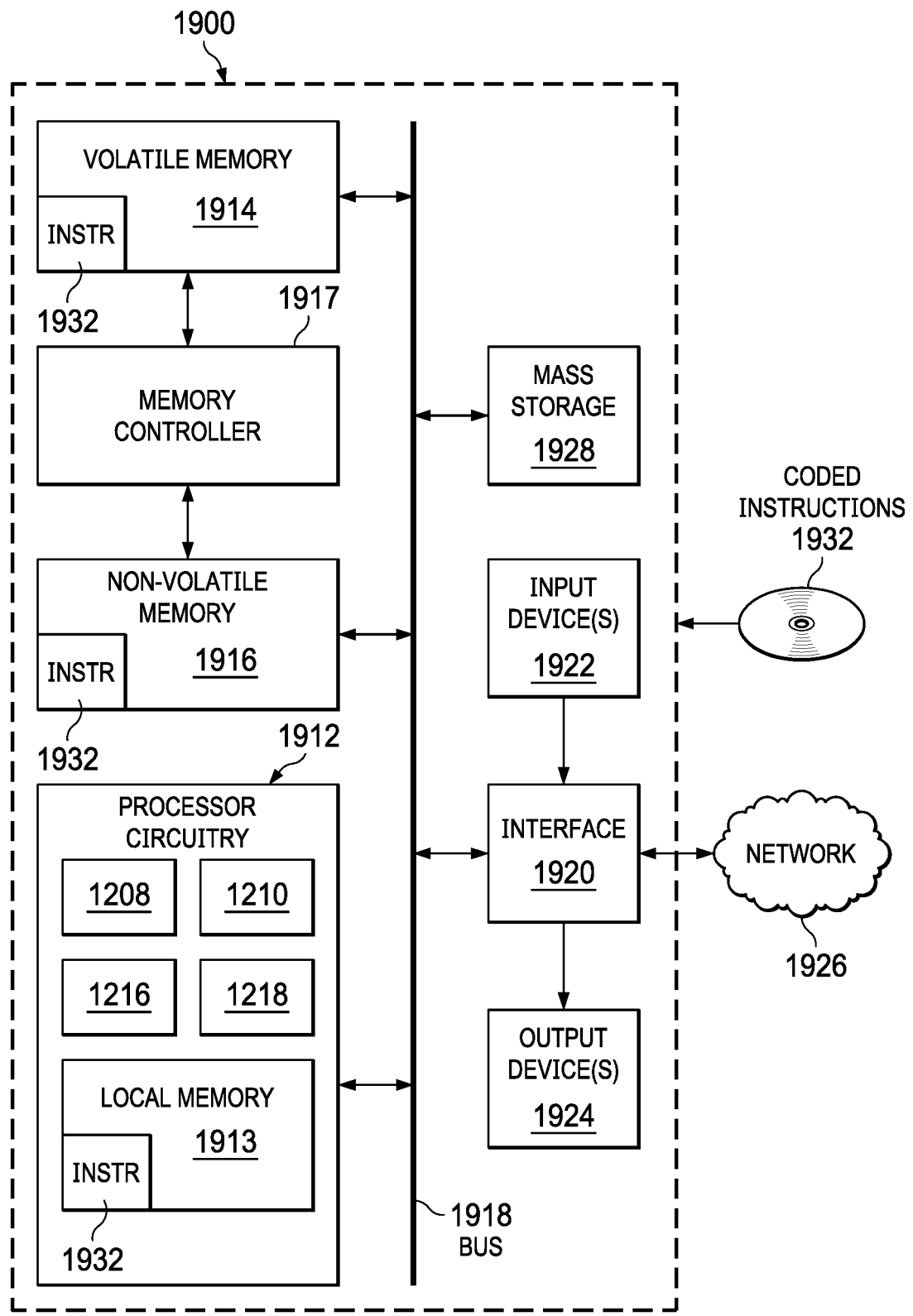
FIG. 19 is a block diagram of an example processing platform including processor circuitry structured to execute example machine readable instructions that implement the method of FIG. 18.

FIG. 19 is a block diagram of an example processor platform 1900 structured to execute and/or instantiate the machine readable instructions and/or operations of FIG. 18 to implement the electronic circuitry 1202 of FIG. 12. Additionally or alternatively, the example processor platform 1900 may be suitable adapted to implement the electronic circuitry 1302 of FIG. 13. The processor platform 1900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1900 of the illustrated example includes processor circuitry 1912. The processor circuitry 1912 of the illustrated example is hardware. For example, the processor circuitry 1912 can be implemented by one or more integrated circuits, logic circuits, FPGAs microprocessors, CPUs, GPUs, DSPs, and/or microcontrollers from any desired family or manufacturer. The processor circuitry 1912 may be implemented by one or more semiconductor based (e.g., silicon based) devices. In this example, the processor circuitry 1912 implements the first oscillator 1208, the second oscillator 1210, the frequency ration engine 1216, and the logic circuitry 1218.

The processor circuitry 1912 of the illustrated example includes a local memory 1913 (e.g., a cache, registers, etc.). The processor circuitry 1912 of the illustrated example is in communication with a main memory including a volatile memory 1914 and a non-volatile memory 1916 by a bus 1918. The volatile memory 1914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1916 may be implemented by flash memory and/or any other desired type of memory device. Access to the main memory 1914, 1916 of the illustrated example is controlled by a memory controller 1917.

The processor platform 1900 of the illustrated example also includes interface circuitry 1920. The interface circuitry 1920 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1922 are connected to the interface circuitry 1920. The input device(s) 1922 permit(s) a user to enter data and/or commands into the processor circuitry 1912. The input device(s) 1922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1924 are also connected to the interface circuitry 1920 of the illustrated example. The output devices 1924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1920 of the illustrated example, thus, typically includes a graphics driver card, a graphics driver chip, and/or graphics processor circuitry such as a GPU.

The interface circuitry 1920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1900 of the illustrated example also includes one or more mass storage devices 1928 to store software and/or data. Examples of such mass storage devices 1928 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1932, which may be implemented by the machine readable instructions of FIG. 18, may be stored in the mass storage device 1928, in the volatile memory 1914, in the non-volatile memory 1916, and/or on a removable non-transitory computer readable storage medium such as a CD or DVD.

Figure 20:
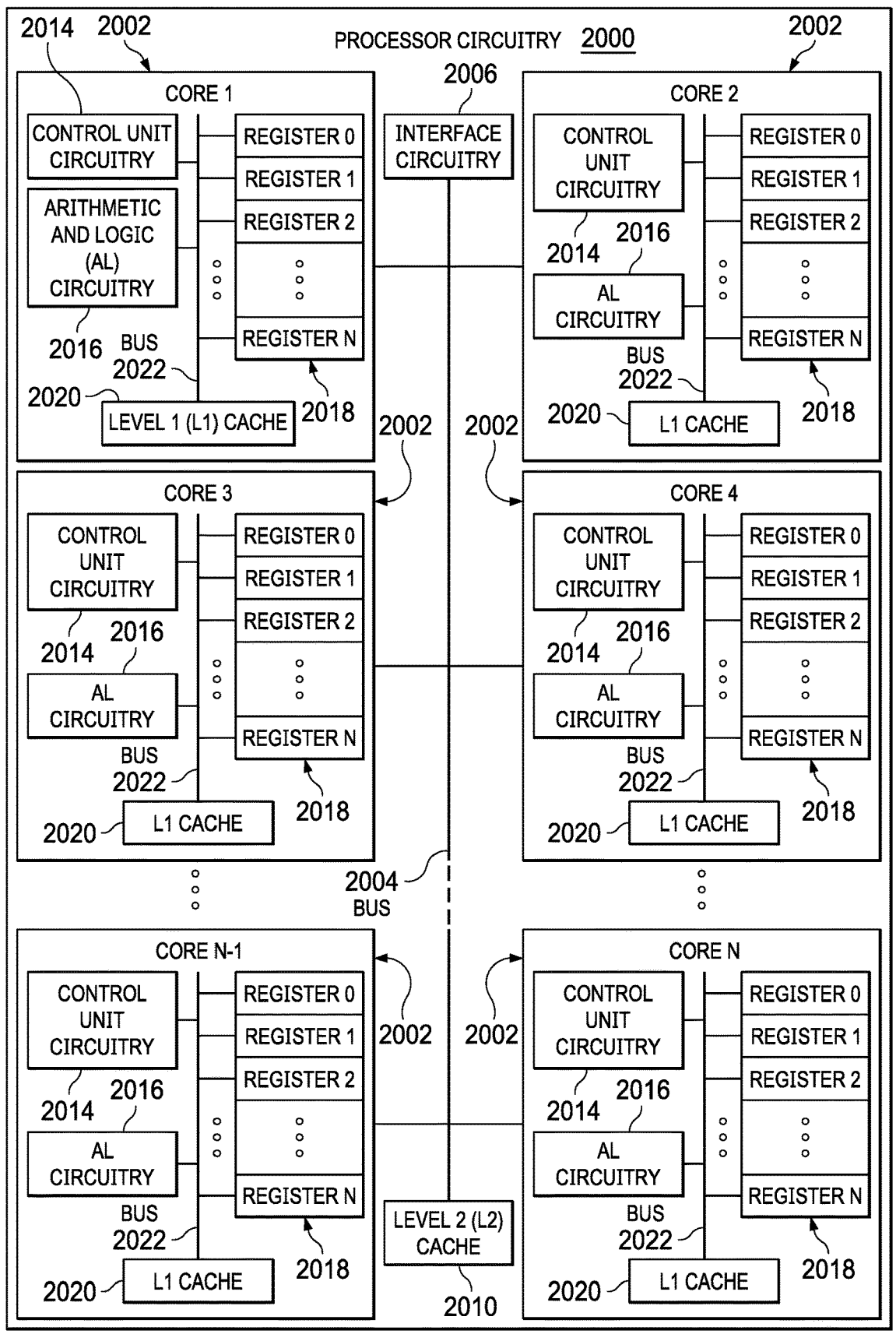
FIG. 20 is a block diagram of an example implementation of the processor circuitry of FIG. 19.

FIG. 20 is a block diagram of an example implementation of the processor circuitry 1912 of FIG. 19. In this example, the processor circuitry 1912 of FIG. 19 is implemented by a microprocessor 2000. For example, the microprocessor 2000 may implement multi-core hardware circuitry such as a CPU, a DSP, a GPU, an XPU, etc. Although it may include any number of example cores 2002 (e.g., 1 core), the microprocessor 2000 of this example is a multi-core semiconductor device including N cores. The cores 2002 of the microprocessor 2000 may operate independently or may cooperate to execute machine readable instructions. For example, machine code corresponding to a firmware program, an embedded software program, or a software program may be executed by one of the cores 2002 or may be executed by multiple ones of the cores 2002 at the same or different times. In some examples, the machine code corresponding to the firmware program, the embedded software program, or the software program is split into threads and executed in parallel by two or more of the cores 2002. The software program may correspond to a portion or all of the machine readable instructions and/or operations represented by the flowchart of FIG. 18.

The cores 2002 may communicate by an example bus 2004. In some examples, the bus 2004 may implement a communication bus to effectuate communication associated with one(s) of the cores 2002. For example, the bus 2004 may implement at least one of an Inter-Integrated Circuit (I2C) bus, a Serial Peripheral Interface (SPI) bus, a PCI bus, or a PCIe bus. Additionally or alternatively, the bus 2004 may implement any other type of computing or electrical bus. The cores 2002 may obtain data, instructions, and/or signals from one or more external devices by example interface circuitry 2006. The cores 2002 may output data, instructions, and/or signals to the one or more external devices by the interface circuitry 2006. Although the cores 2002 of this example include example local memory 2020 (e.g., Level 1 (L1) cache that may be split into an L1 data cache and an L1 instruction cache), the microprocessor 2000 also includes example shared memory 2010 that may be shared by the cores (e.g., Level 2 (L2) cache)) for high-speed access to data and/or instructions. Data and/or instructions may be transferred (e.g., shared) by writing to and/or reading from the shared memory 2010. The local memory 2020 of each of the cores 2002 and the shared memory 2010 may be part of a hierarchy of storage devices including multiple levels of cache memory and the main memory (e.g., the main memory 1914, 1916 of FIG. 19). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 2002 may be referred to as a CPU, DSP, GPU, etc., or any other type of hardware circuitry. Each core 2002 includes control unit circuitry 2014, arithmetic and logic (AL) circuitry (sometimes referred to as an ALU) 2016, a plurality of registers 2018, the L1 cache 2020, and an example bus 2022. Other structures may be present. For example, each core 2002 may include vector unit circuitry, single instruction multiple data (SIMD) unit circuitry, load/store unit (LSU) circuitry, branch/jump unit circuitry, floating-point unit (FPU) circuitry, etc. The control unit circuitry 2014 includes semiconductor-based circuits structured to control (e.g., coordinate) data movement within the corresponding core 2002. The AL circuitry 2016 includes semiconductor-based circuits structured to perform one or more mathematic and/or logic operations on the data within the corresponding core 2002. The AL circuitry 2016 of some examples performs integer based operations. In other examples, the AL circuitry 2016 also performs floating point operations. In yet other examples, the AL circuitry 2016 may include first AL circuitry that performs integer based operations and second AL circuitry that performs floating point operations. In some examples, the AL circuitry 2016 may be referred to as an Arithmetic Logic Unit (ALU). The registers 2018 are semiconductor-based structures to store data and/or instructions such as results of one or more of the operations performed by the AL circuitry 2016 of the corresponding core 2002. For example, the registers 2018 may include vector register(s), SIMD register(s), general purpose register(s), flag register(s), segment register(s), machine specific register(s), instruction pointer register(s), control register(s), debug register(s), memory management register(s), machine check register(s), etc. The registers 2018 may be arranged in a bank as shown in FIG. 20. Alternatively, the registers 2018 may be organized in any other arrangement, format, or structure including distributed throughout the core 2002 to shorten access time. The bus 2022 may implement at least one of an I2C bus, a SPI bus, a PCI bus, or a PCIe bus Each core 2002 and/or, more generally, the microprocessor 2000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 2000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 21:
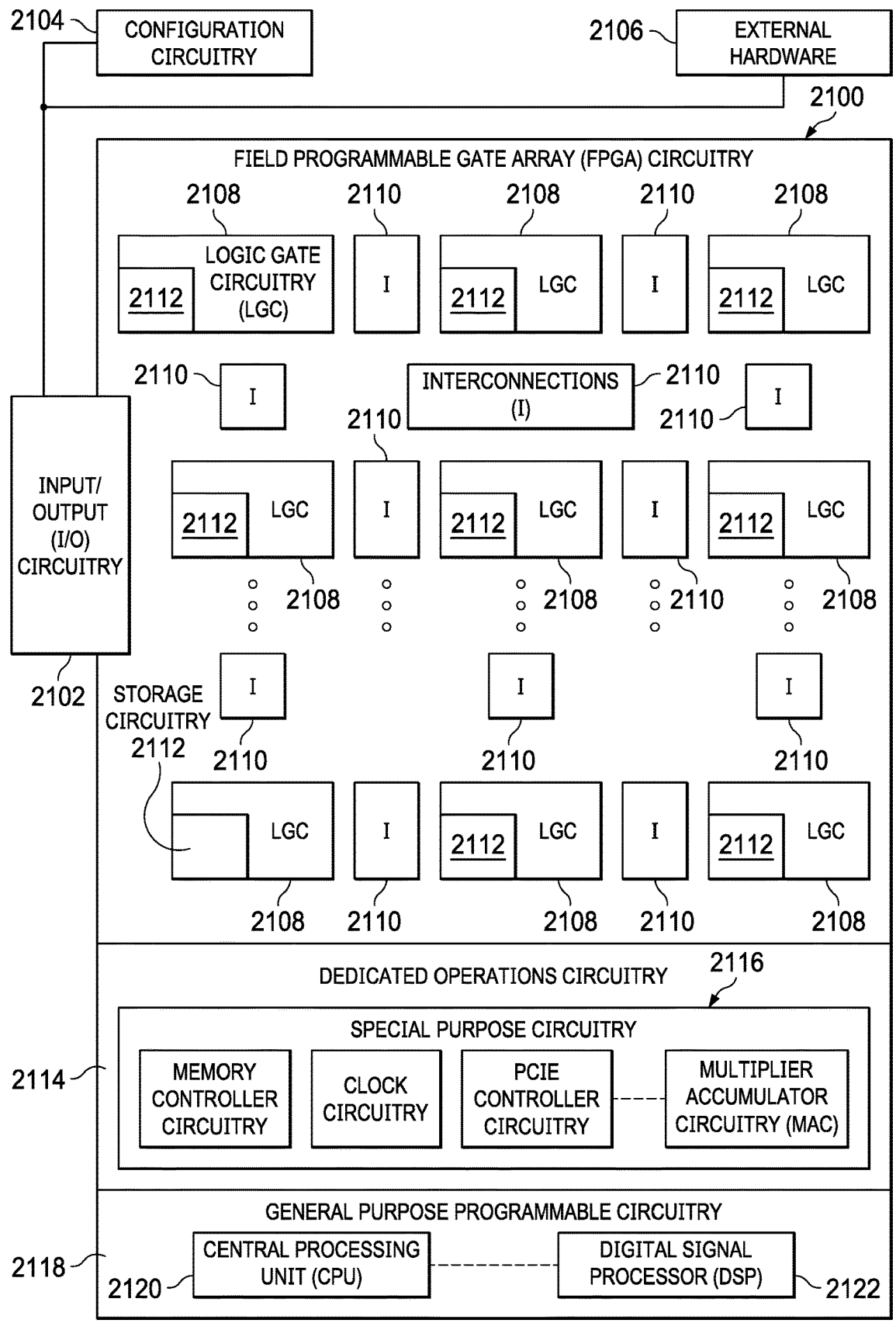
FIG. 21 is a block diagram of another example implementation of the processor circuitry of FIG. 29.

FIG. 21 is a block diagram of another example implementation of the processor circuitry 1912 of FIG. 19. In this example, the processor circuitry 1912 is implemented by FPGA circuitry 2100. The FPGA circuitry 2100 can be used, for example, to perform operations that could otherwise be performed by the example microprocessor 2000 of FIG. 20 executing corresponding machine readable instructions. However, once configured, the FPGA circuitry 2100 instantiates the machine readable instructions in hardware and, thus, can often execute the operations faster than they could be performed by a general purpose microprocessor executing the corresponding software.

More specifically, in contrast to the microprocessor 2000 of FIG. 20 described above (which is a general purpose device that may be programmed to execute some or all of the machine readable instructions represented by the flowchart of FIG. 18 but whose interconnections and logic circuitry are fixed once fabricated), the FPGA circuitry 2100 of the example of FIG. 21 includes interconnections and logic circuitry that may be configured and/or interconnected in different ways after fabrication to instantiate, for example, some or all of the machine readable instructions represented by the flowchart of FIG. 18. In particular, the FPGA 2100 may be thought of as an array of logic gates, interconnections, and switches. The switches can be programmed to change how the logic gates are interconnected by the interconnections, effectively forming one or more dedicated logic circuits (unless and until the FPGA circuitry 2100 is reprogrammed). The configured logic circuits enable the logic gates to cooperate in different ways to perform different operations on data received by input circuitry. Those operations may correspond to some or all of the software represented by the flowchart of FIG. 18. As such, the FPGA circuitry 2100 may be structured to effectively instantiate some or all of the machine readable instructions of the flowchart of FIG. 18 as dedicated logic circuits to perform the operations corresponding to those software instructions in a dedicated manner analogous to an ASIC. Therefore, the FPGA circuitry 2100 may perform the operations corresponding to the some or all of the machine readable instructions of FIG. 18 faster than the general purpose microprocessor can execute the same.

In the example of FIG. 21, the FPGA circuitry 2100 is structured to be programmed (and/or reprogrammed one or more times) by an end user by a hardware description language (HDL) such as Verilog. The FPGA circuitry 2100 of FIG. 21, includes example input/output (I/O) circuitry 2102 to obtain and/or output data to/from example configuration circuitry 2104 and/or external hardware (e.g., external hardware circuitry) 2106. For example, the configuration circuitry 2104 may implement interface circuitry that may obtain machine readable instructions to configure the FPGA circuitry 2100, or portion(s) thereof. In some such examples, the configuration circuitry 2104 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 2106 may implement the microprocessor 2000 of FIG. 20. The FPGA circuitry 2100 also includes an array of example logic gate circuitry 2108, a plurality of example configurable interconnections 2110, and example storage circuitry 2112. The logic gate circuitry 2108 and interconnections 2110 are configurable to instantiate one or more operations that may correspond to at least some of the machine readable instructions of FIG. 18 and/or other desired operations. The logic gate circuitry 2108 shown in FIG. 21 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2108 to enable configuration of the electrical structures and/or the logic gates to form circuits to perform desired operations. The logic gate circuitry 2108 may include other electrical structures such as look-up tables (LUTs), registers (e.g., flip-flops or latches), multiplexers, etc.

The interconnections 2110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2108 to program desired logic circuits.

The storage circuitry 2112 of the illustrated example is structured to store result(s) of the one or more of the operations performed by corresponding logic gates. The storage circuitry 2112 may be implemented by registers or the like. In the illustrated example, the storage circuitry 2112 is distributed amongst the logic gate circuitry 2108 to facilitate access and increase execution speed.

The example FPGA circuitry 2100 of FIG. 21 also includes example Dedicated Operations Circuitry 2114. In this example, the Dedicated Operations Circuitry 2114 includes special purpose circuitry 2116 that may be invoked to implement commonly used functions to avoid the need to program those functions in the field. Examples of such special purpose circuitry 2116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2100 may also include example general purpose programmable circuitry 2118 such as an example CPU 2120 and/or an example DSP 2122. Other general purpose programmable circuitry 2118 may additionally or alternatively be present such as a GPU, an XPU, etc., that can be programmed to perform other operations.

Although FIGS. 20 and 21 illustrate two example implementations of the processor circuitry 1912 of FIG. 19, many other approaches are contemplated. For example, as mentioned above, modern FPGA circuitry may include an on-board CPU, such as one or more of the example CPU 2120 of FIG. 21. Therefore, the processor circuitry 1912 of FIG. 19 may additionally be implemented by combining the example microprocessor 2000 of FIG. 20 and the example FPGA circuitry 2100 of FIG. 21. In some such hybrid examples, a first portion of the machine readable instructions represented by the flowchart of FIG. 18 may be executed by one or more of the cores 2002 of FIG. 20 and a second portion of the machine readable instructions represented by the flowchart of FIG. 18 may be executed by the FPGA circuitry 2100 of FIG. 21.

In some examples, the processor circuitry 1912 of FIG. 19 may be in one or more packages. For example, the processor circuitry 2000 of FIG. 20 and/or the FPGA circuitry 2100 of FIG. 21 may be in one or more packages. In some examples, an XPU may be implemented by the processor circuitry 1912 of FIG. 19, which may be in one or more packages. For example, the XPU may include a CPU in one package, a DSP in another package, a GPU in yet another package, and an FPGA in still yet another package.

"Including" and "comprising" (and all forms and tenses thereof) are used herein to be open ended terms. Thus, whenever a claim employs any form of "include" or "comprise" (such as comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (such as "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, for example, the same entity or object. Additionally, although individual features may be included in different examples or claims, these may possibly be combined, and the inclusion in different examples or claims does not imply that a combination of features is not feasible and/or advantageous.

As used herein, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. As used herein, the phrase "at least one of A or B" (or "at least one of A and B") refers to implementations including any of: (a) at least one A; (b) at least one B; and (c) at least one A and at least one B.

Example methods, apparatus and articles of manufacture described herein improve IR detectors by advantageously integrated all components of such detectors (including a mechanical resonator, a IR filter, and associated electronic circuitry) on a single semiconductor wafer using standard CMOS technology. The monolithic integration of these components on a single die using standard CMOS processes advantageously reduces the costs and complexity of manufacturing IR detectors and enables the manufacture of IR detectors that are smaller in size than other existing detectors. Furthermore, the close proximity of the mechanical resonator and the plasmonic IR absorber made possible by the monolithic integration of the components also enables faster response times with smaller time constants, and lower parasitics, which enables a reduction in power consumption relative to other existing detectors.

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (such as programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal," "node," "interconnection," "pin," and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (such as a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value.

Modifications are possible in the described embodiments, and other embodiments are possible, within the scope of the claims.

What is claimed is:

1. An apparatus comprising:
   a semiconductor substrate;
   a mechanical resonator supported by the substrate, the mechanical resonator including an array of capacitors; and
   a plasmonic infrared (IR) absorber including an array of metal structures, the mechanical resonator between the substrate and the IR absorber.

2. The apparatus of claim 1, wherein the metal structures correspond to a back-end-of-line (BEOL) metallization layer of the mechanical resonator.

3. The apparatus of claim 1, wherein the mechanical resonator is monolithically integrated with the IR absorber on the substrate.

4. The apparatus of claim 1, further including a dielectric material on the substrate, the dielectric material surrounding the mechanical resonator and the IR absorber.

5. The apparatus of claim 4, wherein the substrate includes a cavity to separate the mechanical resonator from the substrate, the mechanical resonator supported by the substrate via the dielectric material.

6. The apparatus of claim 4, wherein the dielectric material includes a trench extending toward the substrate adjacent the array of metal structures.

7. The apparatus of claim 1, wherein ones of the metal structures are aligned with respective ones of the capacitors.

8. The apparatus of claim 1, wherein the metal structures are dimensioned and spaced apart to cause the IR absorber to increase in temperature by a greater amount when exposed to a first wavelength of IR radiation than when exposed to a second wavelength of IR radiation different than the first wavelength, the first wavelength within a particular band of IR radiation, the second wavelength corresponding to any wavelength outside of the particular band of IR radiation.

9. The apparatus of claim 8, wherein the increase in temperature of the IR absorber is to cause an increase in temperature of the mechanical resonator based on thermal conductance and a proximity of the IR absorber to the mechanical resonator.

10. The apparatus of claim 1, wherein the metal structures are isolated from the capacitors by a dielectric material.

11. The apparatus of claim 1, further including metal interconnects that extend between the capacitors and the metal structures.

12. The apparatus of claim 1, wherein the mechanical resonator is a first mechanical resonator, the apparatus further including:
   a second mechanical resonator supported by the substrate; and
   electronic circuitry to generate an output indicative of a measure of IR radiation absorbed by the IR absorber, the output based on a first frequency of oscillation of the first mechanical resonator and a second frequency of oscillation of the second mechanical resonator, the first frequency to change responsive to a change in temperature of the IR absorber due to absorption of the IR radiation.

13. The apparatus of claim 12, wherein the second mechanical resonator does not change temperature due to absorption of the IR radiation.

14. The apparatus of claim 12, wherein the IR absorber is a first IR absorber, the apparatus further including:
   a second IR absorber, the second mechanical resonator between the substrate and the second IR absorber,
   a protective coating to prevent the IR radiation from reaching the second IR absorber.

15. The apparatus of claim 12, wherein the second mechanical resonator and the electronic circuitry are monolithically integrated with the first mechanical resonator.

16. The apparatus of claim 12, further including multiple reference resonators, the multiple reference resonators including the second mechanical resonator, each of the reference resonators having a different temperature coefficient of resonant frequency than other ones of the reference resonators.

17. An integrated circuit package comprising:
a semiconductor die; and
a mold compound to surround the die, the semiconductor die including:
a mechanical resonator;
a plasmonic infrared (IR) absorber in proximity to the mechanical resonator to cause the mechanical resonator to change temperature responsive to absorption of IR radiation; and
electronic circuitry to generate an output indicative of a measure of IR radiation absorbed by the IR absorber;
wherein the semiconductor die includes a semiconductor substrate, the mechanical resonator includes an array of capacitors, and the IR absorber includes an array of metal structures, the array of capacitors positioned between the substrate and the array of metal structures.

18. The integrated circuit package of claim 17, wherein the array of capacitors are spaced apart from the substrate due to a cavity in the substrate.

19. The integrated circuit package of claim 17, wherein the semiconductor die includes a dielectric material surrounding the array of capacitors and surrounding the array of metal structures, the dielectric material include trenches adjacent lateral ends of the array of capacitors, the array of metal structures positioned between the trenches.

20. The integrated circuit package of claim 17, wherein the mold compound includes a cavity to expose the IR absorber to the IR radiation in an external environment.

21. The integrated circuit package of claim 17, wherein the mechanical resonator is a first mechanical resonator, and the IR absorber is a first IR absorber, the semiconductor die including a reference IR sensor structure including a second mechanical resonator and a second IR absorber, the electronic circuitry to generate the output based on a difference in a first resonant frequency of the first mechanical resonator and a second resonant frequency of the second mechanical resonator.

* * * * *